(12) United States Patent
Matsubara

(10) Patent No.: US 7,646,927 B2
(45) Date of Patent: Jan. 12, 2010

(54) IMAGE PROCESSING AND DISPLAY SCHEME FOR RENDERING AN IMAGE AT HIGH SPEED

(75) Inventor: Akio Matsubara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1189 days.

(21) Appl. No.: 10/666,172

(22) Filed: Sep. 19, 2003

(65) Prior Publication Data
US 2005/0058353 A1 Mar. 17, 2005

(30) Foreign Application Priority Data

| Sep. 19, 2002 | (JP) | ............................. 2002-273631 |
| Sep. 19, 2002 | (JP) | ............................. 2002-273997 |
| Sep. 17, 2003 | (JP) | ............................. 2003-325116 |

(51) Int. Cl.
*G06K 9/36* (2006.01)
(52) U.S. Cl. .................. 382/233; 382/248; 709/216
(58) Field of Classification Search ................. 382/233, 382/248; 709/216
See application file for complete search history.

(56) References Cited

U.S. PATENT DOCUMENTS

| 6,144,338 | A  | * | 11/2000 | Davies ................... 342/357.13 |
| 6,184,888 | B1 | * | 2/2001 | Yuasa et al. .................. 345/419 |
| 6,247,019 | B1 | * | 6/2001 | Davies ................... 707/103 R |
| 6,262,741 | B1 | * | 7/2001 | Davies ........................ 345/423 |
| 6,278,432 | B1 | * | 8/2001 | Ratnakar ..................... 715/748 |
| 6,429,949 | B1 | * | 8/2002 | Dziesietnik et al. ......... 358/1.16 |
| 6,724,382 | B2 | * | 4/2004 | Kenyon et al. ............... 345/419 |
| 6,873,329 | B2 | * | 3/2005 | Cohen et al. ................. 345/501 |
| 7,024,046 | B2 | * | 4/2006 | Dekel et al. .................. 382/240 |
| 7,031,506 | B2 | * | 4/2006 | Tsujii et al. .................. 382/132 |
| 7,149,370 | B2 | * | 12/2006 | Willner et al. ............... 382/305 |
| 7,210,099 | B2 | * | 4/2007 | Rohrabaugh et al. ........ 715/249 |
| 2002/0030843 | A1 | * | 3/2002 | Tuli ........................... 358/1.15 |
| 2002/0067374 | A1 | * | 6/2002 | Kenyon ....................... 345/764 |
| 2002/0091738 | A1 | * | 7/2002 | Rohrabaugh et al. ........ 707/517 |
| 2003/0018818 | A1 | * | 1/2003 | Boliek et al. ................. 709/247 |
| 2004/0135784 | A1 | * | 7/2004 | Cohen et al. ................. 345/501 |
| 2004/0136598 | A1 | * | 7/2004 | Le Leannec et al. ........ 382/232 |
| 2004/0217980 | A1 | * | 11/2004 | Radburn et al. ............. 345/672 |
| 2006/0023953 | A1 | * | 2/2006 | Kliorin et al. ............... 382/232 |

(Continued)

FOREIGN PATENT DOCUMENTS

JP          63-92988          4/1988

(Continued)

OTHER PUBLICATIONS

"The JPIK Protocol (JPeg2000 Interactive, Kakadu)" David Taubman Nov. 30, 2001.*

*Primary Examiner*—Bhavesh M Mehta
*Assistant Examiner*—Sean Motsinger
(74) *Attorney, Agent, or Firm*—Blakely, Sokoloff, Taylor & Zafman LLP

(57) ABSTRACT

An image processing apparatus includes: a block decompression unit that decompresses, block by block, a compressed code formed of a plurality of blocks into which image data is divided, where the compressed code is encoded block by block; and a rendering control unit that causes a code to be decompressed and rendered on a display unit, where the code corresponds to at least one of the blocks which one is renderable in the rendering region of the display unit.

12 Claims, 31 Drawing Sheets

U.S. PATENT DOCUMENTS

| | | | |
|---|---|---|---|
| 2006/0256130 A1* | 11/2006 | Gonzalez | 345/619 |
| 2007/0013708 A1* | 1/2007 | Barcklay et al. | 345/557 |
| 2007/0118520 A1* | 5/2007 | Bliss et al. | 707/5 |
| 2007/0176796 A1* | 8/2007 | Bliss et al. | 340/995.14 |

FOREIGN PATENT DOCUMENTS

| | | |
|---|---|---|
| JP | 11-088866 | 3/1999 |
| JP | 2000-036959 | 2/2000 |
| JP | 2000-244745 | 9/2000 |
| JP | 2001-309184 | 11/2001 |
| JP | 2002-091657 | 3/2002 |
| JP | 2002-149153 | 5/2002 |

* cited by examiner

FIG.3
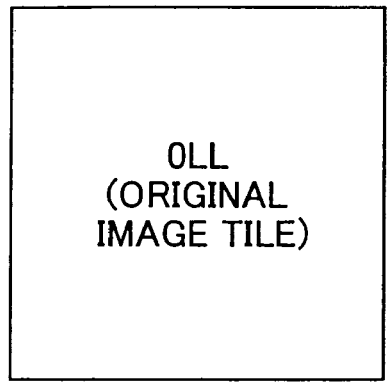
DECOMPOSITION_LEVEL_0
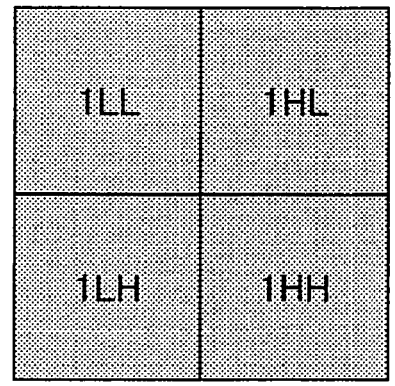
DECOMPOSITION_LEVEL_1
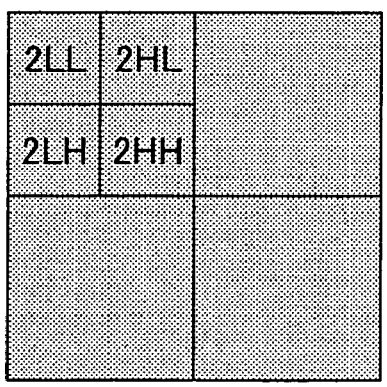
DECOMPOSITION_LEVEL_2
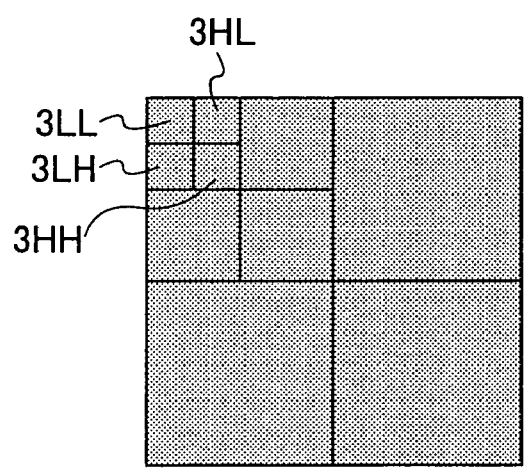
DECOMPOSITION_LEVEL_3

FIG.8

| SOC | MH | 00 | 01 | 02 | 03 | 04 | 10 | 11 | 12 | 13 | 14 | 20 | 21 | 23 | 24 | 30 | 31 | 32 | 33 | 40 | 41 | 42 | 43 | 44 | 45 | 50 | 51 | 52 | 53 | 54 | EOC |

FIG.12

| 00 | 01 | 02 |
|----|----|----|
| 10 | 11 | 12 |

FIG.25

| 00 | 01 | 02 | 03 | 04 |
|----|----|----|----|----|
| 10 | 11 | 12 | 13 | 14 |
| 20 | 21 | 22 | 23 | 24 |
| 30 | 31 | 32 | 33 | 34 |
| 40 | 41 | 42 | 43 | 44 |
| 50 | 51 | 52 | 53 | 54 |

AREA CURRENTLY RENDERED

SCROLLING DIRECTION

AREA CURRENTLY RENDERED

SCROLLING DIRECTION

FIG.29

AREA CURRENTLY RENDERED

| 00 | 01 | 02 | 03 | 04 |
|----|----|----|----|----|
| 10 | 11 | 12 | 13 | 14 |
| 20 | 21 | 22 | 23 | 24 |
| 30 | 31 | 32 | 33 | 34 |
| 40 | 41 | 42 | 43 | 44 |
| 50 | 51 | 52 | 53 | 54 |

FIG.30

AREA CURRENTLY RENDERED

| 00 | 01 | 02 | 03 | 04 |
|----|----|----|----|----|
| 10 | 11 | 12 | 13 | 14 |
| 20 | 21 | 22 | 23 | 24 |
| 30 | 31 | 32 | 33 | 34 |
| 40 | 41 | 42 | 43 | 44 |
| 50 | 51 | 52 | 53 | 54 |

FIG.31

|    |    |    |    |    |
|----|----|----|----|----|
| 00 | 01 | 02 | 03 | 04 |
| 10 | 11 | 12 | 13 | 14 |
| 20 | 21 | 22 | 23 | 24 |
| 30 | 31 | 32 | 33 | 34 |
| 40 | 41 | 42 | 43 | 44 |
| 50 | 51 | 52 | 53 | 54 |

AREA CURRENTLY RENDERED

FIG.32

|    |    |    |    |    |
|----|----|----|----|----|
| 00 | 01 | 02 | 03 | 04 |
| 10 | 11 | 12 | 13 | 14 |
| 20 | 21 | 22 | 23 | 24 |
| 30 | 31 | 32 | 33 | 34 |
| 40 | 41 | 42 | 43 | 44 |
| 50 | 51 | 52 | 53 | 54 |

AREA CURRENTLY RENDERED

AREA CURRENTLY RENDERED

FIG.37
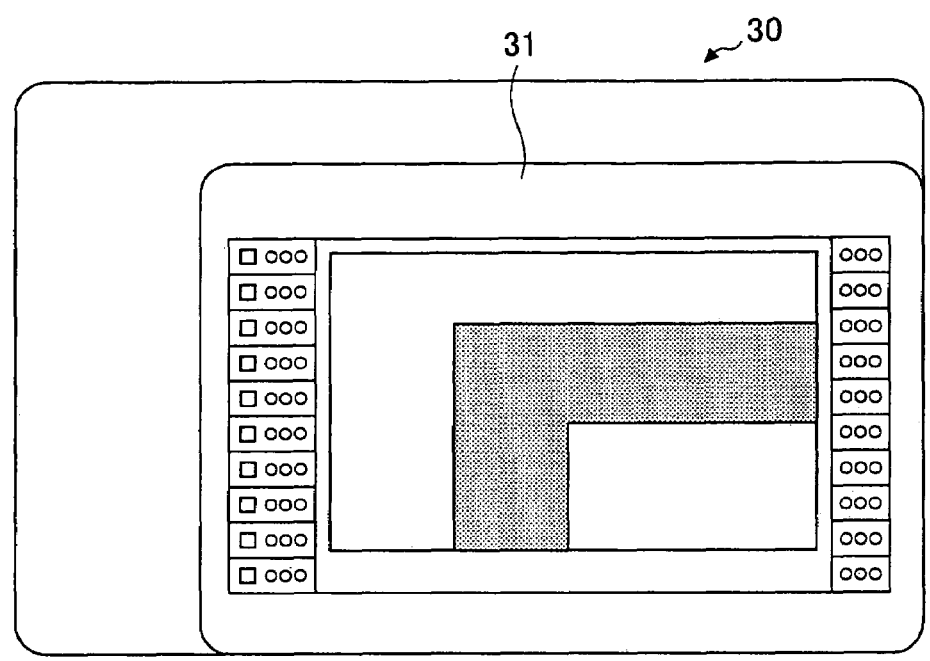
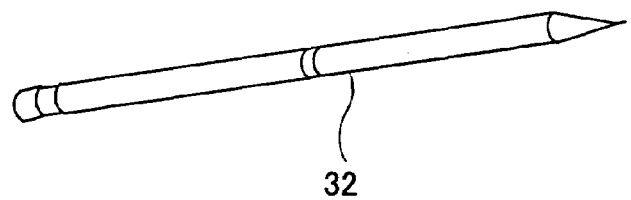

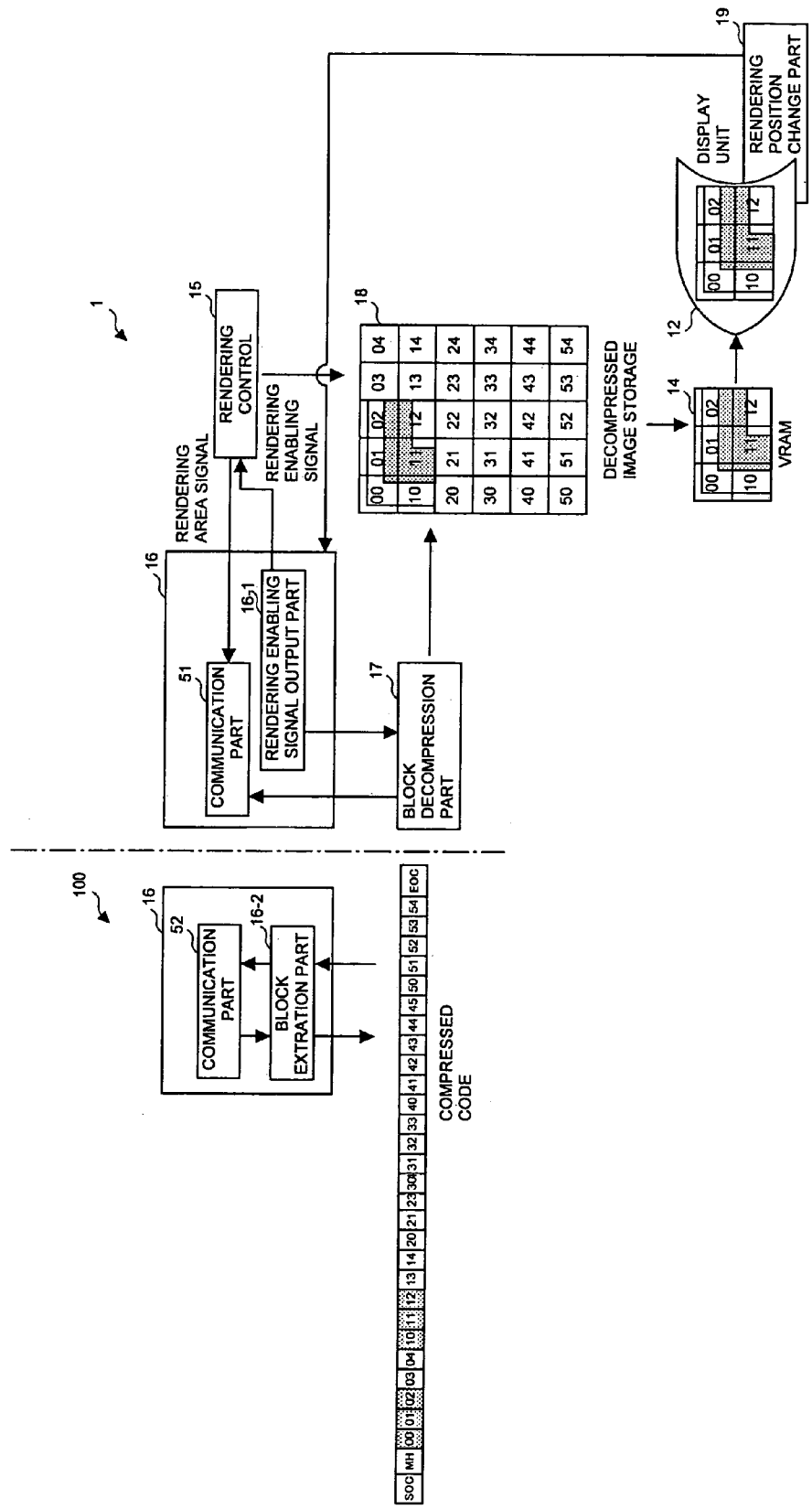

IMAGE PROCESSING AND DISPLAY SCHEME FOR RENDERING AN IMAGE AT HIGH SPEED

The present patent application claims priority to the corresponding Japanese Application No. 2002-273631 filed on Sep. 19, 2002, Japanese Application No. 2002-273997 filed on Sep. 19, 2002, and Japanese Application No. 2003-325116 filed on Sep. 17, 2003, the entire contents of which are hereby incorporated by reference.

BACKGROUND OF THE INVENTION

1. Field of the Invention

The present invention relates to an image processing apparatus, an image display apparatus, an image processing method, an image display system, and an image processing system. The present invention also relates to a program for causing a computer to execute such an image processing method, and a computer-readable storage medium storing such a program.

2. Description of the Related Art

Recently, with image input apparatuses such as digital cameras and scanners becoming popular, it has been more commonly practiced to store digital image data in a storage device such as a memory or a hard disk of a personal computer (PC) or in an optical disk such as a CD-ROM, or to transmit digital image data via the Internet. Such digital image data is compressed and coded to be stored in the storage device or the optical disk.

However, in the case of decompressing and rendering a compressed code on a display unit having a rendering region considerably small in comparison to the size of the original image, such as the display unit of a PC, a personal digital assistant (PDA), or a mobile terminal, the image cannot be rendered before the entire compressed code is decompressed. This causes a problem because it takes a large amount of time before the image is rendered on the display unit.

There have been several proposed conventional methods to solve this problem.

According to one of the methods, in the case of decompressing a horizontally continuous panoramic image, the frame is divided horizontally in a plurality of frame parts, so that the frame parts are decomposed one after another from the one to be rendered earliest in time. According to this decompression method, however, the frame should also be divided vertically in the case of using an input device having high resolution in two-dimensional directions, such as a high-resolution scanner. Otherwise, if the image becomes greater in size vertically than the rendering region, there would be a problem that compressed code that has been coded according to a coding method performing no vertical division cannot be decompressed at high speed or that work memory is consumed more than required.

According to another method, a JPEG codestream is decompressed continuously from its beginning, and the decompression result is managed by the line in accordance with the size of the rendering region. According to this method, decompression can be performed at high speed by the effect of the high-speed decompression characteristic of JPEG itself. However, it is always necessary to decompress the codestream from its beginning in order to decompress data in the end part of the codestream. Accordingly, the decompression result of the leading part of the codestream is discarded. Thus, there is room for improvement left in this method in terms of the effective use of CPU resources and the high-speed decompression of the end data of the codestream.

According to yet another method, in the case of rendering a large image such as a map stored on an optical disk, each image is divided into unit-size images, and the unit-size images necessary for rendering the image are successively read out as disclosed in Japanese Laid-Open Patent Application No. 63-92988 (Patent Document 1). According to this method, when each image is divided into unit-size images, and the unit-size images necessary for rendering the image are successively read out, toroidal memory structures in which the upper and lower ends and the right and left ends of memory spaces are connected as link addresses are coupled as essential components. This not only complicates the control, but also requires a memory capacity area twice as much as that of the rendering memory, thus resulting in high costs.

Under these circumstances, coding methods that divide a large image into two-dimensional smaller blocks called blocks by a method called block division and decompress each block independently as disclosed in Japanese Laid-Open Patent Application No. 2000-36959 (Patent Document 2) have been proposed recently.

However, even in the case of decompressing a compressed image coded by the coding method disclosed in Patent Document 2, a display unit having a rendering region considerably small in comparison to the size of the original image takes a lot of time, for the area of its rendering region, to render the image. Therefore, the coding method of Patent Document 2 provides no fundamental solution to the problem.

SUMMARY OF THE INVENTION

Image processing and display scheme for rendering an image at high speed are disclosed. In one embodiment, the image processing apparatus comprises a block decompression unit to decompress, block by block, a compressed code having a plurality of blocks into which image data is divided, where the compressed code is encoded block by block. The image processing apparatus also includes a rendering control unit to cause a code to be decompressed and rendered on a display unit, where the code corresponds to at least one of the blocks which one is renderable in a rendering region of the display unit.

BRIEF DESCRIPTION OF THE DRAWINGS

Other objects, features and advantages of the present invention will become more apparent from the following detailed description when read in conjunction with the accompanying drawings, in which:

FIG. 3 is a diagram showing sub-bands of each decomposition level in the case where the number of decomposition levels is 3;

FIG. 8 is a diagram for illustrating a compressed code generated based on the divided image of FIG. 7 in accordance with the coding and decoding algorithm based on the DWT according to an embodiment of the present invention;

FIG. 12 is a diagram showing the relationship between part of an image (an area to be rendered) and a block including the part of the image according to an embodiment of the present invention;

FIG. 25 is a diagram showing blocks to be decompressed first according to an embodiment of the present invention;

FIG. 29 is a diagram showing a prediction in the case of employing a random access part according to an embodiment of the present invention;

FIG. 30 is a diagram showing a prediction in the case of employing a hand tool according to an embodiment of the present invention;

FIG. 31 is a diagram showing a prediction in the case of employing a particular position specifying part according to a first mode according to an embodiment of the present invention;

FIG. 32 is a diagram showing a prediction in the case of employing the particular position specifying part according to a second mode according to an embodiment of the present invention;

FIG. 37 is a schematic plan view of a personal digital assistant according to an embodiment of the present invention;

FIG. 39 is a functional block diagram of an image display system where a rendering enabling signal output part and a block extraction part are provided separately in the image display apparatus and a server computer, respectively, according to an embodiment of the present invention.

DETAILED DESCRIPTION OF THE PRESENT INVENTION

Figure 1:
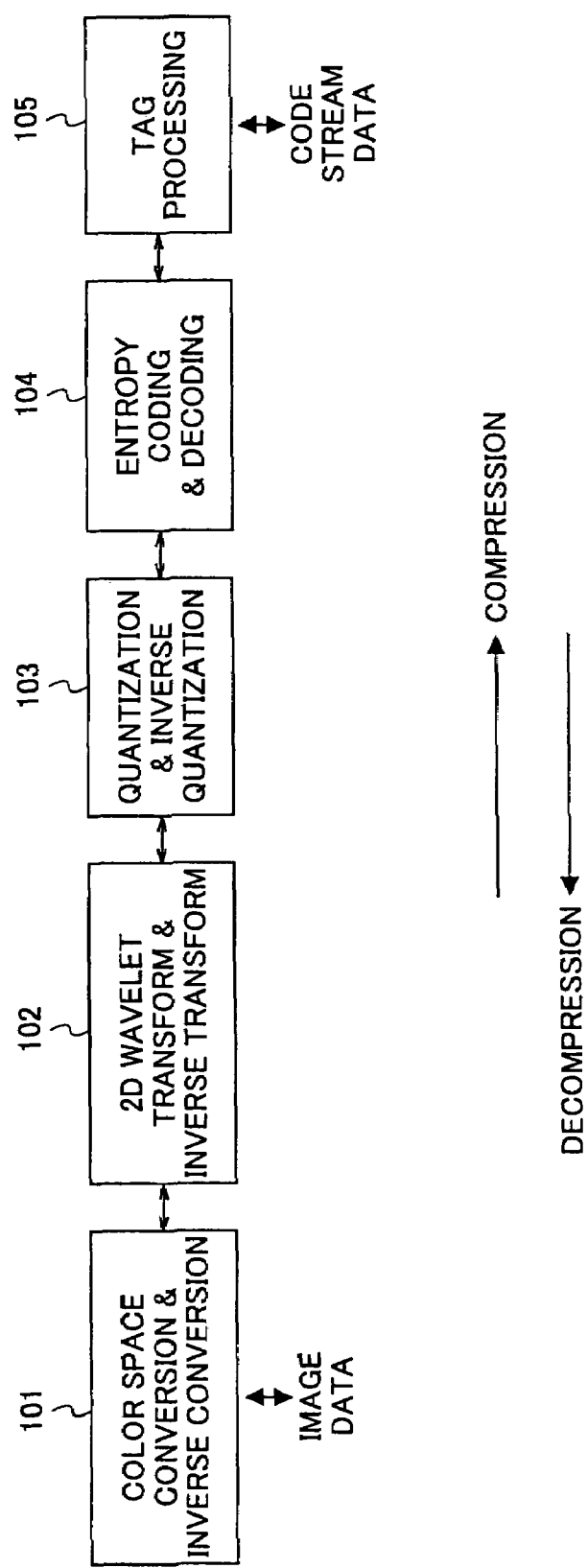
FIG. 1 is a functional block diagram showing a system realizing the hierarchical coding algorithm that forms the basis of the coding and decoding algorithm based on the discrete wavelet transform (DWT)

Accordingly, in embodiments of the present invention an image processing apparatus, an image display apparatus, an image processing method, an image display system, and an image processing system are provided in which one or more of the above-described disadvantages are eliminated. Also, one embodiment of the present invention provides a program for causing a computer to execute such an image processing method, and a computer-readable storage medium storing such a program.

More specific embodiments of the present invention provide an image processing apparatus, an image display apparatus, an image processing method, an image display system, and an image processing system that, even in the case of changing the area of an image that is to be rendered (an area to be rendered) in the rendering region of a display unit after the compressed code of a block corresponding to that area is decompressed and rendered, can render the area to be rendered at high speed in accordance with the change.

Other more specific embodiments of the present invention provide an image processing apparatus, an image display apparatus, an image processing method, an image display system, and an image processing system that can perform image rendering at higher speed in the case of changing the area to be rendered of an image.

Yet another more specific embodiment of the present invention is to provide a program for causing a computer to execute any of such methods, and a computer-readable storage medium storing such a program.

One embodiment of the present invention comprises an image processing apparatus that includes: a block decompression unit that decompresses, block by block, a compressed code formed of a plurality of blocks into which image data is divided, where the compressed code is encoded block by block; and a rendering control unit that causes a code to be decompressed and rendered on a display unit, where the code corresponds to at least one of the blocks which one is renderable in a rendering region of the display unit.

One embodiment of the present invention comprises an image processing apparatus that includes: a block decompression unit that decompresses, block by block, a compressed code formed of a plurality of blocks into which image data is divided, where the compressed code is encoded block by block; and a rendering control unit that causes a first code to be decompressed and rendered on a display unit, where the first code corresponds to at least one of the blocks that is renderable in a rendering region of the display unit, and thereafter, causes a second code to be decompressed, where the second code corresponding to at least one of the blocks that is outside the rendering region.

According to the above-described image processing apparatuses, the code corresponding to at least one of the blocks which one is renderable in a rendering region of the display unit is decompressed and rendered. Accordingly, it is possible to produce the same effect as if the decompression were performed at higher rates than by the conventional decompression method, thus making it possible to reduce user waiting time in rendering the image.

Another embodiment of the present invention comprises an image processing apparatus that includes: a block decompression unit that decompresses, block by block, a compressed code formed of a plurality of blocks into which data of an image is divided, where the compressed code is encoded block by block; a rendering control unit that specifies an area to be rendered of the image and causes the specified area to be rendered on a display unit; a block extraction unit that receives a rendering area signal indicating the area to be rendered on the display unit from the rendering control unit and extracts a block corresponding to the area to be rendered from the blocks of the compressed code; a rendering area block decompression unit that causes the block decompression unit to decompress part of the compressed code that corresponds to the extracted block; a decompressed image storage unit that stores part of the image that corresponds to the decompressed part of the compressed code; a rendering enabling signal output unit that outputs to the rendering control unit a rendering enabling signal indicating completion of decompression of the area to be rendered after the decompression of the part of the compressed code is completed; and a specified area rendering unit that receives the rendering enabling signal from the rendering enabling signal output unit and causes the part of the image stored in the decompressed image storage unit to be rendered on the display unit.

According to the above-described image processing apparatus, the compressed codes of the blocks corresponding to the specified area to be rendered are decompressed and the corresponding image is rendered before the decompression of the entire compressed code is completed. Accordingly, it is possible to produce the same effect as if the decompression were performed at higher rates than by the conventional decompression method, thus making it possible to reduce user waiting time in rendering the image.

Another embodiment of the present invention comprise an image processing apparatus that, in decompressing a compressed code, decompresses part of the compressed code that corresponds to a block of data of an image that corresponds to an area of the image that is to be rendered in a rendering region of a display unit, and renders the decompressed part of the compressed code before decompressing the remaining part of the compressed code. This image processing apparatus includes: a rendered image change instruction unit that gives an instruction to change the area to be rendered from a first area to a second area of the image; and a changed image rendering unit that, when the instruction is given by the rendered image change instruction unit, decompresses part of the compressed code that corresponds to a block of the data of the image that corresponds to the second area of the image, and renders the second area of the image in the rendering region.

According to the above-described image processing apparatus, in one embodiment, when an instruction to change the area to be rendered from a first area to a second area of the image is given after the part of the compressed code corresponding to a block corresponding to the first area of the image is decompressed and the first area of the image is rendered, the part of the compressed code corresponding to a block corresponding to the second area of the image is decompressed and the second area of the image is rendered. Accordingly, even if the area to be rendered is changed, the image can be rendered at high speed in accordance with the change.

Another embodiment of the present invention comprises an image display apparatus that includes: a display unit that displays information; a receiver unit that receives via a network a compressed code formed of a plurality of blocks into which data of an image is divided, where the compressed code is encoded block by block; and an image processing apparatus according to one embodiment of the present invention, where the image processing apparatus decompresses the received compressed code and causes the received compressed code to be rendered on the display unit.

Another embodiment of the present invention comprises an image display apparatus that includes: a display unit that displays information; an image compression unit that divides data for an image into a plurality of blocks and compresses and encodes each of the blocks into a compressed code; and an image processing apparatus according to one embodiment of the present invention, where the image processing apparatus decompresses the compressed code generated by the image compression unit and causes the compressed code to be rendered on the display unit.

The above-described image display apparatuses may produce the same effects as the above-described image processing apparatus.

Another embodiment of the present invention comprises an image processing method for decompressing, block by block, a compressed code having a plurality of blocks into which image data is divided, where the compressed code is encoded block by block, and where the image processing method includes: decompressing a code and rendering the code on a display unit, where the code corresponds to at least one of the blocks that is renderable in a rendering region of the display unit.

Another embodiment of the present invention comprises an image processing method for decompressing, block by block, a compressed code having a plurality of blocks into which image data is divided, where the compressed code is encoded block by block, and where the image processing method includes: (a) decompressing a first code and rendering the first code on a display unit, where the first code corresponds to at least one of the blocks that is renderable in a rendering region of the display unit; and (b) decompressing a second code corresponding to at least one of the blocks that is outside the rendering region after the first operation (a).

According to the above-described image processing methods, in one embodiment, the code corresponding to at least one of the blocks that is renderable in a rendering region of the display unit is decompressed and rendered. Accordingly, it is possible to produce the same effect as if the decompression were performed at higher rates than by the conventional decompression method, thus making it possible to reduce user waiting time in rendering the image.

Another embodiment of the present invention comprises an image processing method that, in decompressing a compressed code, decompresses part of the compressed code that corresponds to a block of data of an image that corresponds to an area of the image that is to be rendered on a display unit, and renders the decompressed part of the compressed code before decompressing the remaining part of the compressed code. In one embodiment, the image processing method includes: (a) giving an instruction to change the area to be rendered from a first area to a second area of the image; and (b) decompressing part of the compressed code corresponding to a block of the data of the image that corresponds to the second area of the image and rendering the second area of the image when the instruction is given by the first operation (a).

According to the above-described image processing method, in one embodiment, when an instruction to change the area to be rendered from a first area to a second area of the image is given after the part of the compressed code corresponding to a block corresponding to the first area of the image is decompressed and the first area of the image is rendered, the part of the compressed code corresponding to a block corresponding to the second area of the image is decompressed and the second area of the image is rendered. Accordingly, even if the area to be rendered is changed, the image can be rendered at high speed in accordance with the change.

Another embodiment of the present invention comprises a computer-readable recording medium storing a program for causing a computer to execute an image processing method for decompressing, block by block, a compressed code having a plurality of blocks into which image data is divided, where the compressed code is encoded block by block, and where the image processing method includes: decompressing a code and rendering the code on a display unit, where the code corresponds to at least one of the blocks that is renderable in a rendering region of the display unit.

Another embodiment of the present invention comprises a computer-readable recording medium storing a program for causing a computer to execute an image processing method for decompressing, block by block, a compressed code having a plurality of blocks into which image data is divided, where the compressed code is encoded block by block, and where the image processing method includes: (a) decompressing a first code and rendering the first code on a display unit, where the first code corresponds to at least one of the blocks that is renderable in a rendering region of the display unit; and (b) decompressing a second code corresponding to at least one of the blocks that is outside the rendering region after the first operation (a).

Another embodiment of the present invention comprises a computer-readable recording medium storing a program for causing a computer to execute an image processing method that, in decompressing a compressed code, decompresses part of the compressed code that corresponds to a block of data of an image that corresponds to an area of the image that is to be rendered on a display unit, and renders the decompressed part of the compressed code before decompressing the remaining part of the compressed code, where the image processing method includes: (a) giving an instruction to change the area to be rendered from a first area to a second area of the image; and (b) decompressing part of the compressed code corresponding to a block of the data of the image that corresponds to the second area of the image and rendering the second area of the image when the instruction is given by the first operation (a).

Another embodiment of the present invention comprises an image display system including a server computer and a client computer connected to the server computer via a network, where the image display system includes: a block decompression unit that decompresses, block by block, a compressed code having a plurality of blocks into which data of an image is divided, where the compressed code is encoded block by block; a rendering control unit that specifies an area to be rendered of the image and causes the specified area to be rendered on a display unit; a block extraction unit that receives a rendering area signal indicating the area to be rendered on the display unit from the rendering control unit, and extracts a block corresponding to the area to be rendered from the blocks of the compressed code; a rendering area block decompression unit that causes that block decompression unit to decompress part of the compressed code that corresponds to the extracted block; a decompressed image storage unit that stores part of the image that corresponds to the decompressed part of the compressed code; a rendering enabling signal output unit that outputs to the rendering control unit a rendering enabling signal indicating completion of decompression of the area to be rendered after the decompression of the part of the compressed code is completed; and a specified area rendering unit that receives the rendering enabling signal from the rendering enabling signal output unit and causes the part of the image stored in the decompressed image storage part to be rendered on the display unit.

According to the above-described image display system, in one embodiment, the compressed codes of the blocks corresponding to the specified area to be rendered are decompressed and the corresponding image is rendered before the decompression of the entire compressed code is completed. Accordingly, it is possible to produce the same effect as if the decompression were performed at higher rates than by the conventional decompression method, thus making it possible to reduce user waiting time in rendering the image.

Another embodiment of the present invention comprises an image display system including a server computer and a client computer connected to the server computer via a network, where the image display system, in decompressing a compressed code, decompresses part of the compressed code that corresponds to a block of data of an image that corresponds to an area of the image that is to be rendered in a rendering region of a display unit, and rendering the decompressed part of the compressed code before decompressing the remaining part of the compressed code, where the image display system includes: a rendered image change instruction unit that gives an instruction to change the area to be rendered from a first area to a second area of the image; and a changed image rendering unit that, when the instruction is given by the rendered image change instruction unit, decompresses part of the compressed code that corresponds to a block of the data of the image that corresponds to the second area of the image, and renders the second area of the image in the rendering region.

According to the above-described image display system, in one embodiment, when an instruction to change the area to be rendered from a first area to a second area of the image is given after the part of the compressed code corresponding to a block corresponding to the first area of the image is decompressed and the first area of the image is rendered, the part of the compressed code corresponding to a block corresponding to the second area of the image is decompressed and the second area of the image is rendered. Accordingly, even if the area to be rendered is changed, the image can be rendered at high speed in accordance with the change.

Another of the present invention comprises an image processing system that includes: a display unit that displays information; a block decompression unit that decompresses, block by block, a compressed code having a plurality of blocks into which image data is divided, where the compressed code is encoded block by block; and a rendering control unit that causes a code to be decompressed and rendered on a display unit, where the code corresponds to at least one of the blocks which one is renderable in a rendering region of the display unit.

Another of the present invention comprises an image processing system that includes: a display unit that displays information; a block decompression part that decompresses, block by block, a compressed code having a plurality of blocks into which image data is divided, where the compressed code being encoded block by block; and a rendering control part that causes a first code to be decompressed and rendered on a display unit, where the first code corresponds to at least one of the blocks that is renderable in a rendering region of the display unit, and thereafter, causes a second code to be decompressed, where the second code corresponds to at least one of the blocks that is outside the rendering region.

According to the above-described image processing systems, in one embodiment, the code corresponding to at least one of the blocks that is renderable in a rendering region of the display unit is decompressed and rendered. Accordingly, it is possible to produce the same effect as if the decompression were performed at higher rates than by the conventional decompression method, thus making it possible to reduce user waiting time in rendering the image.

A description is given below, with reference to the accompanying drawings, of embodiments of the present invention.

First, a description is given schematically of the "hierarchical coding algorithm" and the "JPEG2000 algorithm," which are the premises of the embodiments of the present invention. A typical example of the coding and decoding algorithm based on the discrete wavelet transform (DWT) is the JPEG2000 algorithm.

FIG. 1 is a functional block diagram showing a system realizing the hierarchical coding algorithm that forms the basis of the coding and decoding algorithm based on the DWT. This system, which functions as an image compression unit, includes a color space conversion and inverse conversion unit 101, a two-dimensional (2D) wavelet transform and inverse transform unit 102, a quantization and inverse quantization unit 103, an entropy coding and decoding unit 104, and a tag processing unit 105.

One of the major differences between this system and the conventional JPEG algorithm is the transform method. JPEG employs the discrete cosine transform (DCT) while the hierarchical coding algorithm employs the DWT in the 2D wavelet transform and inverse transform unit 102. Compared with the DCT, the DWT enjoys the advantage of excellent image quality in a highly compressed region. This advantage is one of the major reasons the DWT is employed in JPEG2000, which is a successor algorithm to JPEG.

Another major difference is that the hierarchical coding algorithm additionally includes a functional block called the tag processing unit 105 at the final stage of the system for code formation. The tag processing unit 105 generates compressed data as codestream data at the time of image compression and interprets codestream data necessary for decompression at the time of image decompression. The codestream data allows JPEG2000 to realize a variety of convenient functions.

The color space conversion and inverse conversion unit 101 of FIG. 1 is connected to a unit for inputting and outputting an original image. For instance, the color space conversion and inverse conversion unit 101 converts the RGB colorimetric system made up of primary color system components of red (R), green (G), and blue (B) or the YMC colorimetric system made up of complementary color system components of yellow (Y), magenta (M), and cyan (C) to the YUV or YCbCr colorimetric system, or performs the inverse conversion thereof.

Next, a description is given of the coding and decoding algorithm based on the DWT.

Figure 2:
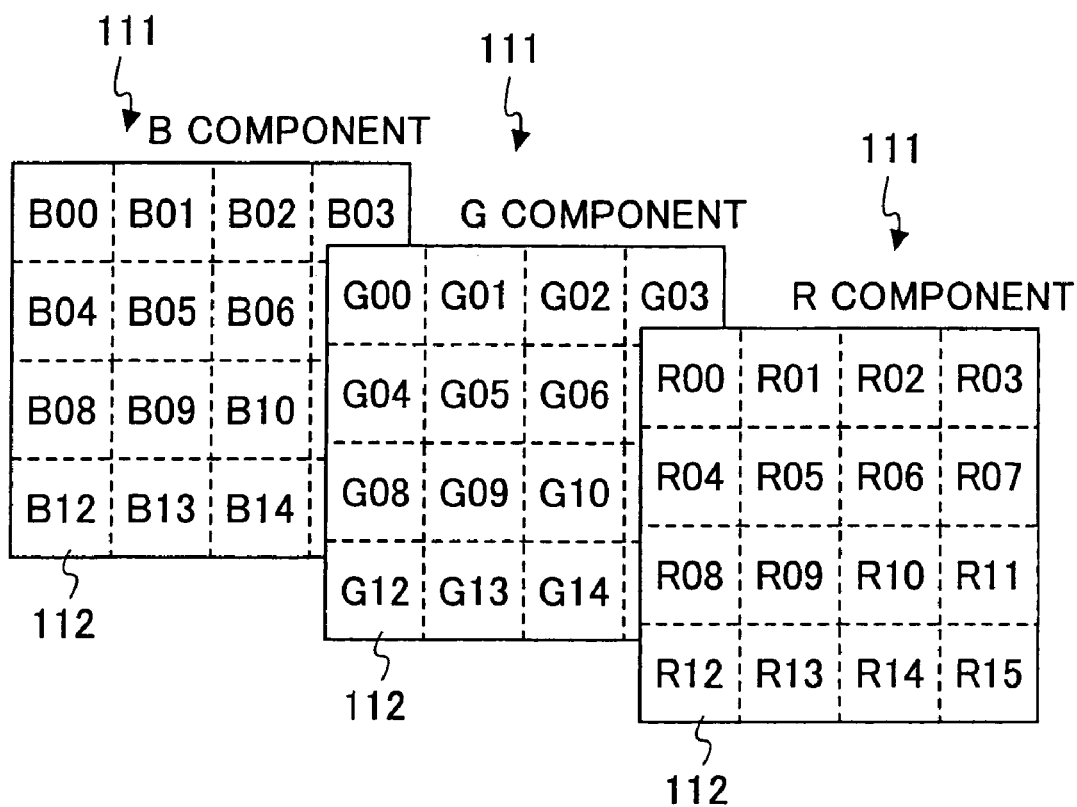
FIG. 2 is a diagram for illustrating rectangular regions of each component of an original image.

Referring to FIG. 2, generally, in a color image, each component 111 (RGB primary color system in this case) of the original image is divided into rectangular regions 112. The rectangular regions 112 are generally referred to as tiles, and are hereinafter referred to as blocks. In the case of FIG. 2, each component 111 is divided into 16 (4×4) rectangular blocks 112. Each of the blocks 112 (R00, R01, ..., R15, G00, G01, ..., G15, B00, B01, ..., B15 in FIG. 2) becomes a basic unit in the image data compression and decompression process. Accordingly, the compression and decompression of image data is performed independently for each component 111 and for each block 112.

Referring to FIG. 1, at the time of encoding the image data, the data of each block 112 of each component 111 is input to the color space conversion and inverse conversion unit 101 and subjected to color space conversion. Thereafter, the data is subjected to 2D wavelet transform (forward transform) in the 2D wavelet transform and inverse transform unit 102 and spatially divided into frequency bands.

FIG. 3 is a diagram showing the sub-bands of each decomposition level in the case where the number of decomposition levels is 3. That is, the 2D wavelet transform is performed on the block original image (0LL) of Decomposition Level 0 obtained by dividing the original image into blocks, so that the block original image is separated into the sub-bands (1LL, 1HL, 1LH, and 1HH) shown at Decomposition Level 1. Successively thereafter, the 2D wavelet transform is performed on the low-frequency component 1LL at this level so as to separate the 1LL into the sub-bands (2LL, 2HL, 2LH, and 2HH) shown at Decomposition Level 2. Similarly, the 2D wavelet transform is performed on the low-frequency component 2LL so as to separate the 2LL into the sub-bands (3LL, 3HL, 3LH, and 3HH) shown at Decomposition Level 3. In FIG. 3, the sub-bands to be subjected to encoding are indicated by hatching at each decomposition level. For instance, when the number of decomposition levels is 3, the hatched sub-bands (3LL, 3HL, 3LH, 3HH, 2HL, 2LH, 2HH, 1HL, 1LH, and 1HH) are subjected to encoding.

Next, the target bits to be encoded are determined in a specified encoding order. Then, the quantization and inverse quantization unit 103 generates a code for each target bit, referring to the target bit and its peripheral context.

Figure 4:
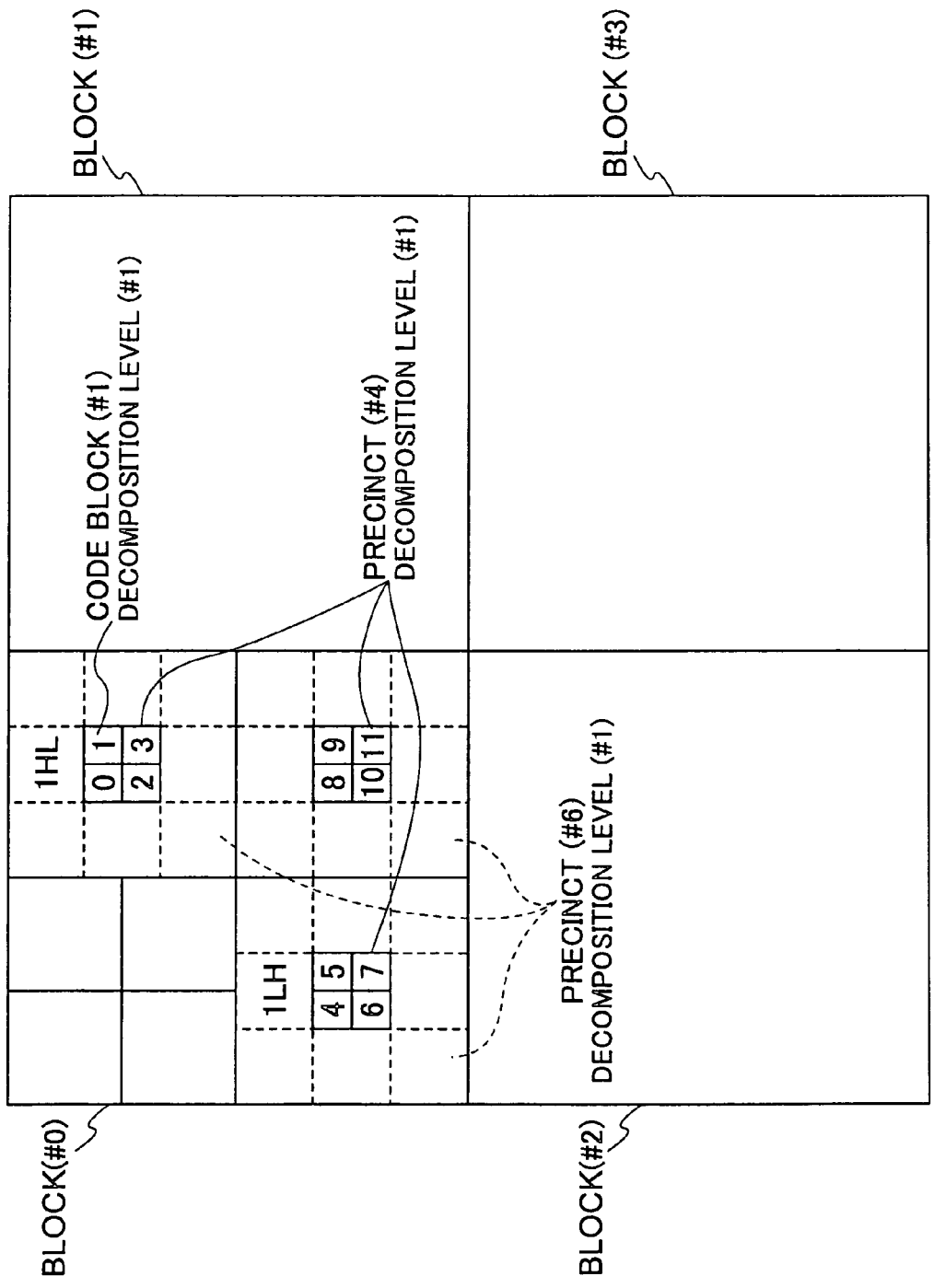
FIG. 4 is a diagram for illustrating a precinct.

Sub-band by sub-band, the quantized wavelet coefficients are divided into non-overlapping rectangles called "precincts". The precincts are introduced to ensure random access to any region in implementation. As shown in FIG. 4, each precinct is composed of three spatially matching rectangular regions. Further, each precinct is divided into non-overlapping rectangular "code blocks." Each code block becomes a basic unit in performing entropy coding. The precinct is a partitioned region having a size of horizontally $2^{PPx}$ and vertically $2^{PPy}$ with (0, 0) being the origin. The code block is an encoding unit. The size of the code block (Xc, Yc) is required to be $2^n$. The range of (Xc, Yc) is defined by $4 \leq Xc \leq 1024$, $4 \leq Yc \leq 1024$, and $Xc*Yc \leq 4096$. The size of the code block remains the same in each hierarchical level (reduction level) irrespective of the sub-bands, but is restricted by the size of the precinct. Specifically, the code block is smaller in size than specified depending on the size of the precinct (the size of the coefficient block of the sub-band) where the hierarchical level is high.

The entropy coding and decoding unit 104 of FIG. 1 performs encoding on the blocks 112 of each component 111 by probability estimation from the contexts and the target bits. Thus, the encoding is performed block 112 by block 112 for each component 111 of the original image. Finally, the tag processing unit 105 connects all the coded data supplied from the entropy coding and decoding unit 104 into a single coded data stream (codestream data), and adds a tag thereto.

Figure 5:
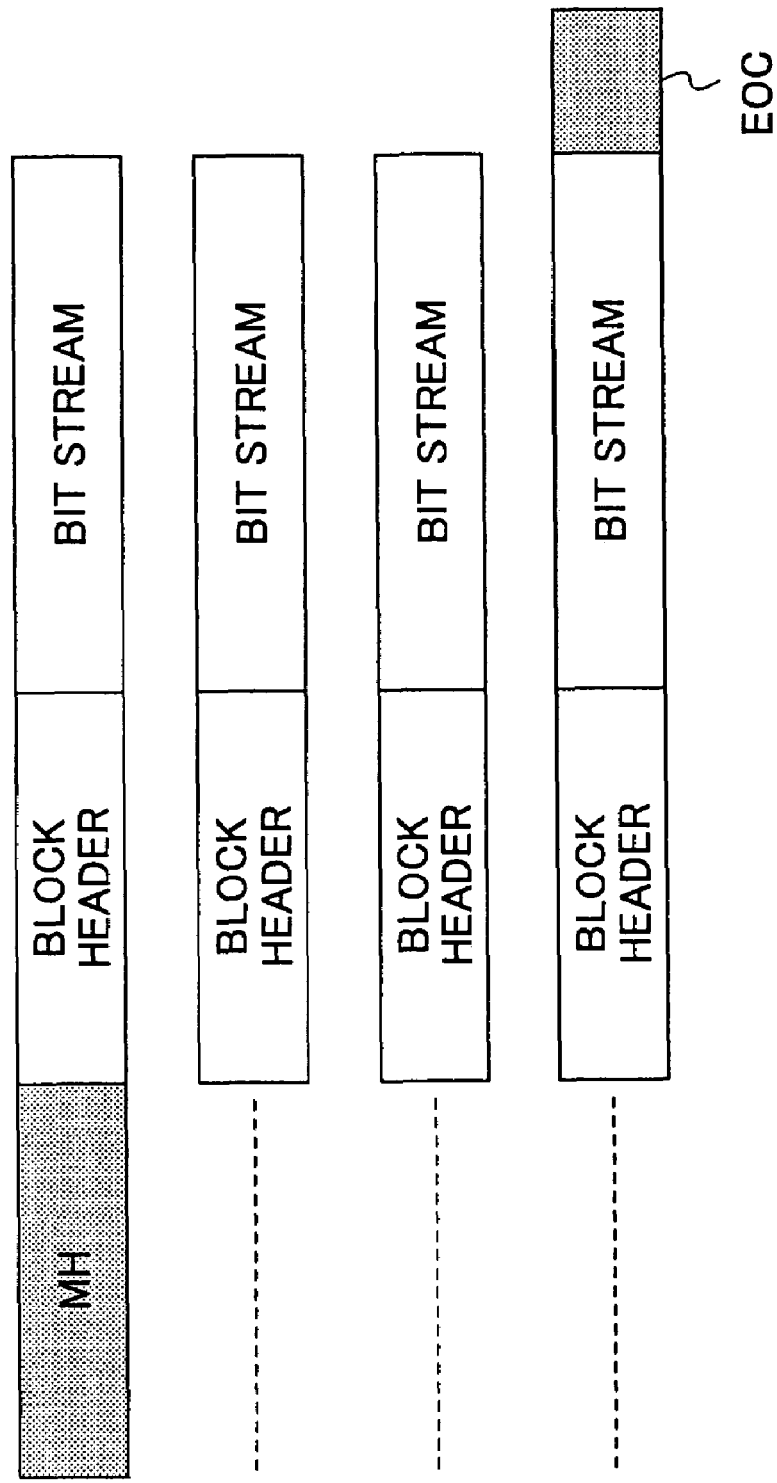
FIG. 5 is a schematic diagram showing a structure of codestream data of a frame.

FIG. 5 is a schematic diagram showing a structure of the codestream data of a frame. Tag information called a main header is added to the head of the codestream data, and tag information called a block header is added to the head of each of the coded data (bit stream) of each block 112. The main header is followed by the bit streams and their block headers of the blocks 112. Another tag (EOC: end of codestream) is added to the tail (terminal) end of the codestream data.

On the other hand, at the time of decoding coded data, image data is generated from the codestream data of the blocks 112 of the components 111, which is a reverse process to the encoding process of the image data. In this case, the tag processing unit 105 interprets the tag information added to the codestream data input from the outside. Then, the tag processing unit 105 decomposes the input codestream data into the codestream data of the blocks 112 of the components 111, and decodes (decompresses) the codestream data block 112 by block 112 for each component 111. At this point, the positions of the target bits to be subjected to the decoding are determined according to the order based on the tag information within the codestream data, and the quantization and inverse quantization unit 103 generates a context from the arrangement of the peripheral bits (already decoded) of the position of each target bit. The entropy coding and decoding unit 104 performs decoding based on probability estimation from the contexts and the codestream data so as to generate the target bits, and writes the target bits to their respective positions. The thus decoded data is spatially divided into frequency bands. Therefore, each block 112 of each component 111 of the image data can be restored by subjecting the decoded data to 2D wavelet inverse transform in the 2D wavelet transform and inverse transform unit 102. The color space conversion and inverse conversion unit 101 converts the restored data to the image data of the original colorimetric system.

Figure 6:
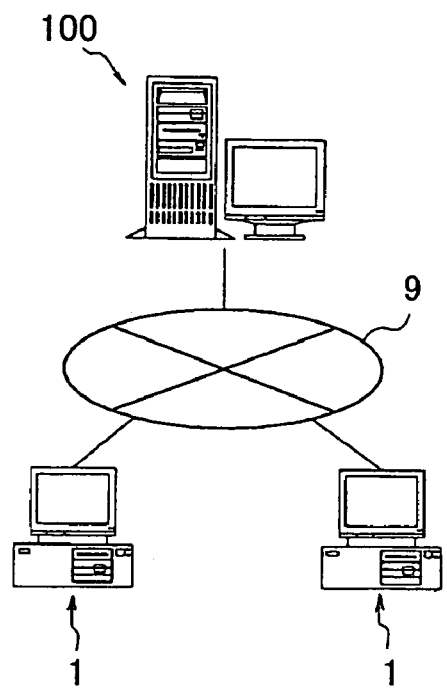
FIG. 6 is a diagram showing a configuration of a system including an image display apparatus according to an embodiment of the present invention.

A description is given of an embodiment of the present invention. FIG. 6 is a diagram showing a configuration of an image display system including image display apparatuses 1 to which the present invention is applied. Referring to FIG. 6, each image display apparatus 1, which is a client computer is, for instance, a personal computer, and is connectable through a network 9, which may be the Internet, to a server computer 100 storing a variety of image data.

Figure 7:
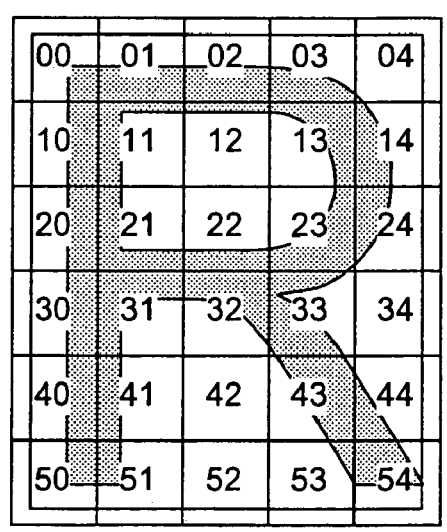
FIG. 7 is a diagram for illustrating an image divided in two-dimensional directions according to an embodiment of the present invention.

In this embodiment, the image data stored in the server computer 100 are compressed codes generated in accordance with the coding and decoding algorithm based on the DWT. Specifically, an image divided in two-dimensional directions (a two-dimensionally divided image) as shown in FIG. 7 is compressed and encoded to be arranged in a one-dimensional direction so that a compressed code (codestream) structured as shown in FIG. 8 is obtained. Referring to FIG. 8, SOC indicates a marker segment that marks the start of the codestream, and MH indicates a main header, which stores values common to the entire codestream. The common values include, for instance, the vertical block size, the horizontal block size, the vertical image size, and the horizontal image size. The MH is followed by the coded block data. In FIG. 8, the data obtained by compressing the blocks of FIG. 7 horizontally (in the main scanning direction) and vertically (in the sub scanning direction) in accordance with the block numbers are arranged. An EOC marker positioned at the end of the compressed code of FIG. 8 is a marker segment that indicates the terminal end of the compressed code.

Such a compressed code may be created by any image coding method that divides an image into blocks. That is, the method of creating such a compressed code is not limited to the coding and decoding algorithm based on the DWT, and any other image coding method that operates in the same way is employable.

Figure 9:
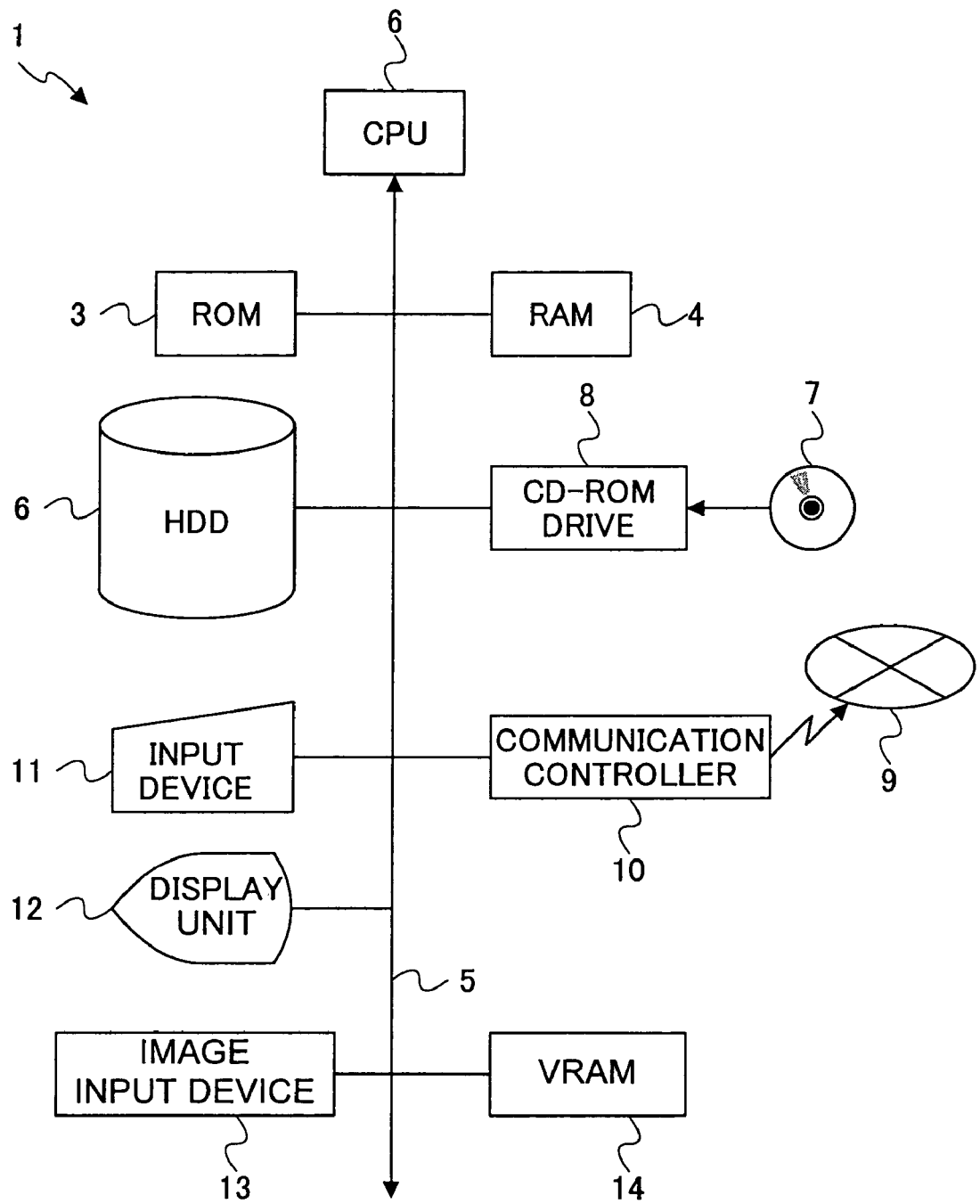
FIG. 9 is a block diagram showing a hardware configuration of the image display apparatus according to an embodiment of the present invention.

Next, a description is given of the image display apparatus 1. FIG. 9 is a block diagram showing a hardware configuration of the image display apparatus 1. Referring to FIG. 9, the image display apparatus 1 includes a CPU (central processing unit) 2 that performs centralized control of the image display apparatus 1. The CPU 2 is connected through a bus 5 to a RAM (read-only memory) 3 storing a BIOS and a RAM (random access memory) 4 storing data in a rewritable manner. The RAM 4, which has the characteristic of storing data in a rewritable manner, functions as a work area for the CPU 2 and plays a role of, for instance, an input buffer.

An HDD (hard disk drive) 6 as an external storage device, a CD-ROM drive 8 for reading data from a CD-ROM 7 as a mechanism for reading a distributed computer software program, a communication controller 10 controlling the communication between the image display apparatus 1 and the network 9, an input device such as a keyboard and/or a mouse, a display unit 12 such as a CRT (cathode ray tube) or an LCD (liquid crystal display), and an image input device 13 functioning as an image reader, such as a scanner, are connected to the bus 5 through an I/O part (not graphically represented). Further, a VRAM (video random access memory) 14 retaining (storing) rendering data is connected to the bus 5.

A compressed code (as shown in FIG. 8) downloaded via the network 9 from the server computer 100, or the compressed code (as shown in FIG. 8) of a read image input through the image input device 13 is stored in the HDD 6. A reception part that receives a compressed code through the network 9 is thus realized.

The CD-ROM 7 of FIG. 9, which realizes a storage medium of one or more embodiments of the present invention, stores an OS (operating system) and a variety of computer software. The CPU 2 reads out the computer software from the CD-ROM 7 using the CD-ROM drive 8, and installs the read-out computer software in the HDD 6.

In addition to the CD-ROM 7, optical disks such as a DVD, magneto-optical disks, magnetic disk such as a flexible disk, and various types of media such as a semiconductor memory are employable as storage media of the present invention. Further, the computer software may be downloaded via the communication controller 10 from the network 9 to be installed in the HDD 6. In this case, a storage device storing the computer software in the transmitter-side server may be a storage medium of the present invention. The computer software may be operable on a predetermined OS. In this case, the computer software may have part of the below-described operations performed by the OS. Alternatively, the computer software may be included in a group of program files forming a predetermined application or OS.

The CPU 2, which controls the operation of the entire image display apparatus 1, performs various operations based on the computer software loaded into the HDD 6 employed as the main memory of the image display apparatus 1.

Figure 10:
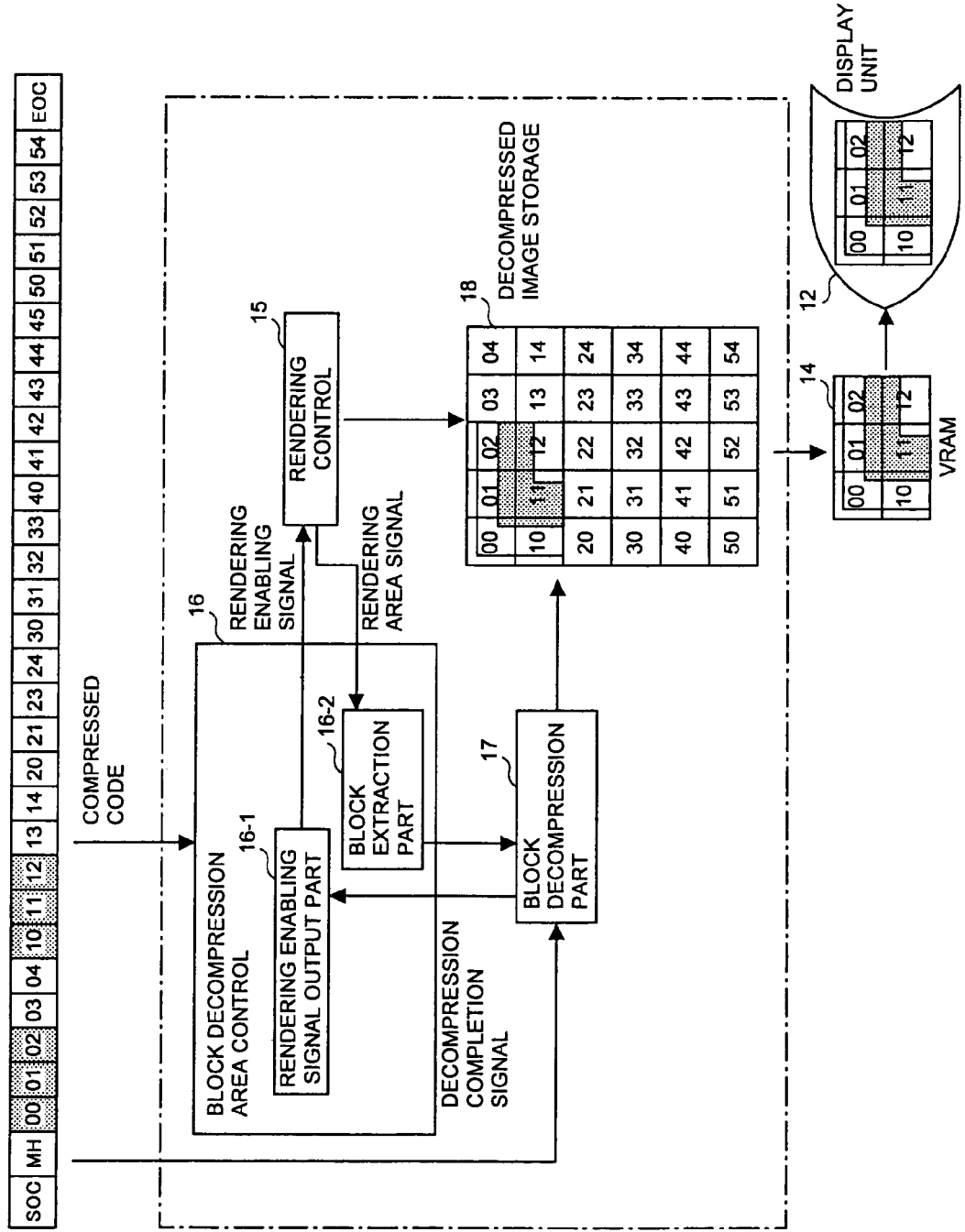
FIG. 10 is a functional block diagram showing the image display apparatus according to an embodiment of the present invention.

Next, a description is given of the contents of the operations that the CPU 2 of the image display apparatus 1 performs based on the computer software. FIG. 10 is a functional block diagram of the image display apparatus 1. Referring to FIG. 10, the CPU 2, by operating based on the computer software, realizes the functions of a rendering control unit 15, a block decompression area control unit 16 (a rendering enabling signal output unit 16-1 and a block extraction unit 16-2), a block decompression unit 17, and a decompressed image storage unit 18. An image processing apparatus according to this embodiment is realized by the rendering control unit 15, the block decompression area control unit 16, the block decompression unit 17, and the decompressed image storage unit 18.

Schematically, in the case of, for instance, rendering a compressed code (as shown in FIG. 8) generated in accordance with the above-described coding and decoding algorithm based on the DWT from image data input from the network 9 via the image input device 13 or the communication controller 10, the compressed code is supplied to the block decompression unit 17. At this point, the rendering control unit 15 supplies the block decompression area control unit 16 with a rendering area signal that represents the area of an image which area is be rendered (an area to be rendered) in the rendering region of the display unit 12. The area to be rendered represented by the display area signal, which is stored in the RAM 4, corresponds to the size of the window (rendering region) of the display unit 12, which size is stored in the RAM 4. Further, the block extraction unit 16-2 of the block decompression area control unit 16 extracts the compressed code of each block of the image data corresponding to the area to be rendered on the display unit 12 represented by the display area signal supplied from the display control unit 15, and supplies the extracted compressed code to the block decompression unit 17. Then, the block decompression unit 17 first decompresses the compressed code of each block corresponding to the area to be displayed.

The rendering region of the display unit 12 refers to any region of the display unit 12 in which region an image is rendered. For instance, in the case of a PDA, a palmtop PC, or a Legacy PC, the rendering region may refer to the entire display of the display unit 12. In the case of a normal PC, the rendering region may refer to a particular window at the time of multi-window display. Further, in the case of, for instance, attaching a thumbnail image to album software, the rendering region may refer to a region to which the image is attached.

After completing the decompression of the compressed code of each block corresponding to the area to be rendered, the block decompression unit 17 supplies the rendering enabling signal output unit 16-1 of the block decompression area control unit 16 with a decompression completion signal that indicates the completion of the decompression. Receiving the decompression completion signal, the rendering enabling signal output unit 16-1 of the block decompression area control unit 16 outputs to the rendering control unit 15 a rendering enabling signal indicating that it is possible to render the specified area to be rendered (the specified area to be rendered is renderable). At this point, the compressed codes of all the blocks of the image data have not been decompressed. Therefore, the block decompression unit 17 goes on to decompress those compressed codes that have not been decompressed. That is, the rendering enabling signal is transmitted before the compressed codes of all the blocks of the image data have been decompressed. Thus, the block decompression unit 17 decompresses the compressed codes of (or the part of the compressed code corresponding to) the remaining blocks successively after the decompression of the compressed code of each block corresponding to the area to be rendered is completed and the image corresponding to the decompressed compressed code is rendered. Therefore, even in the case of changing the area to be rendered to another area of the image, the image can be rendered at high speed in accordance with the change.

The decompressed image storage unit 18 temporarily stores (the compressed code of) each block thus decompressed by the block decompression unit 17 in the RAM 4. Thereafter, based on the instruction from the rendering control unit 15, each decompressed block is loaded into the VRAM 14 to be rendered on the display unit 12. In other words, when the decompression of each block corresponding to a predetermined area to be rendered of the image is completed, the predetermined area to be rendered is rendered on the display unit 12 without waiting for the completion of the decompression of the compressed codes of all the blocks of the image data. Thereby, the specified area rendering part of the image display apparatus 1 is realized.

An expatiation is given below, with reference to the flowchart of FIG. 11, of the flow of a block decompression area control operation performed by the block decompression area control unit 16 according to an embodiment.

Figure 12:
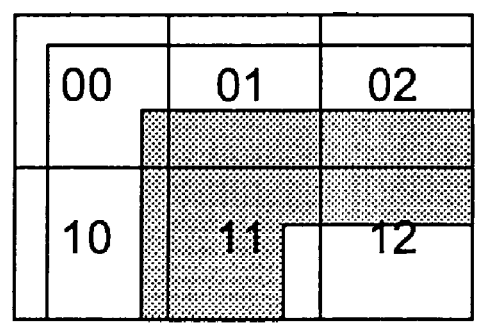
Figure 13:
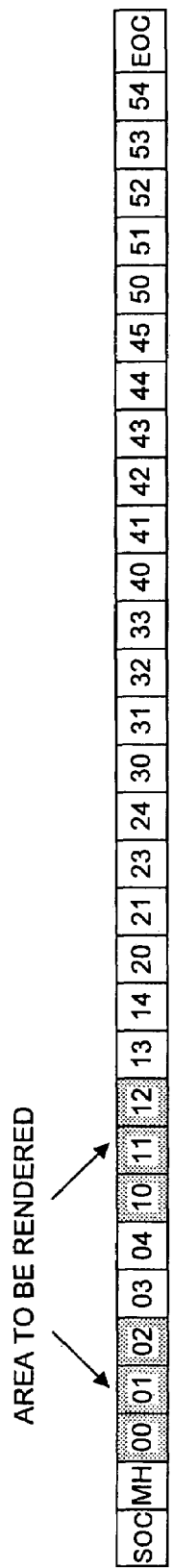
FIG. 13 is a diagram showing the relationship between the area to be rendered and the blocks in the compressed code according to an embodiment of the present invention.

In the following description, the operation of rendering the part of the image of FIG. 7 that corresponds to the area to be rendered on the display unit 12 as shown in FIG. 12 is taken as an example. FIG. 12 is a diagram showing the relationship between the part of the image (the area to be rendered) and the blocks including the part of the image. FIG. 13 is a diagram showing the relationship between the area to be rendered and the blocks in the compressed code. FIGS. 12 and 13 show that the blocks including the area to be rendered are those indicated by the block numbers of "00," "01," "02," "10," "11," and "12." In this case, the blocks are specified by the block numbers. However, it is sufficient if each of the blocks may be uniquely specified. Accordingly, each block may be specified by its start address and size or its start and end addresses so that the same effect may be produced.

Figure 11:
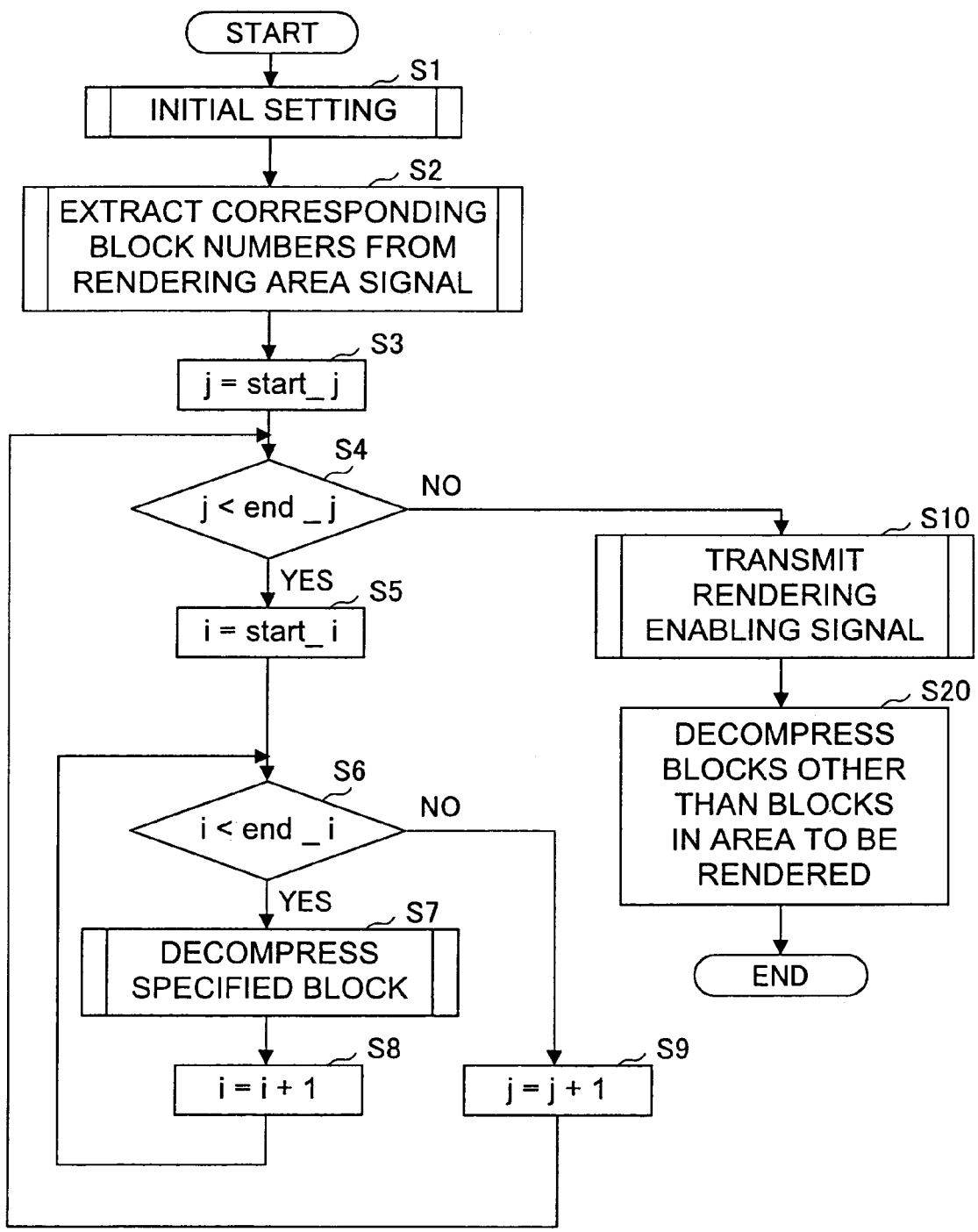
FIG. 11 is a flowchart of an image rendering operation according to an embodiment of the present invention.

When a compressed code generated in accordance with the coding and decoding algorithm based on the DWT is obtained and the block decompression area control operation is started, first, in step S1 of FIG. 11, an initial setting operation is performed. In the initial setting operation, the main header information of the compressed code is read so that information such as bit depths and color components is obtained therefrom. At this point, the compressed code may be read up to its end (EOC).

Figure 14:
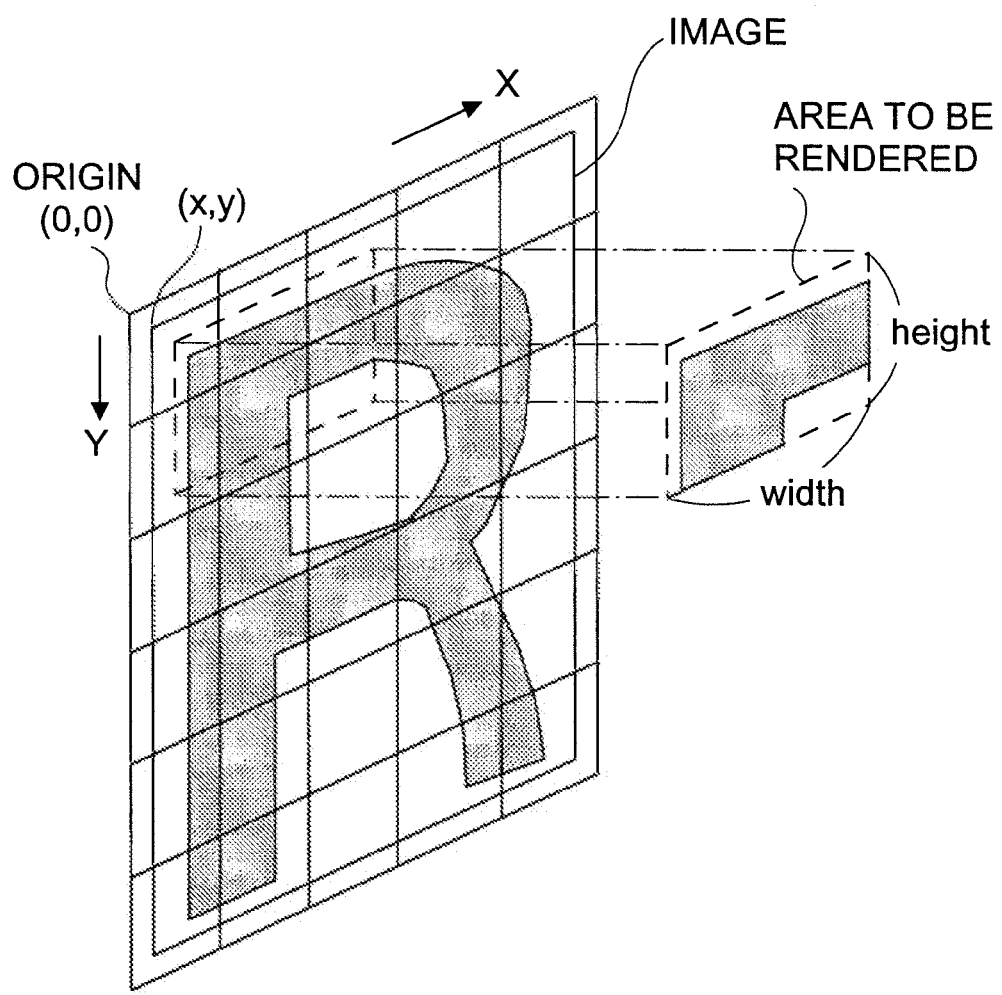
FIG. 14 is a diagram for illustrating the values of a rendering area signal according to an embodiment of the present invention.

Next, in step S2, the block numbers corresponding to the rendering area signal supplied from the rendering control unit 15 are extracted. Referring to FIG. 14, the values of the rendering area signal (x, y, width, height) represent the X-coordinate (x) and Y-coordinate (y) of the uppermost leftmost point, the width (width), and the height (height) of the area to be rendered of the image in the coordinate system whose uppermost leftmost point, X-axis, and Y-axis are defined by the origin of the image to be expanded at the time of decompressing the compressed code, the main (primary) scanning direction, and the sub (secondary) scanning direction, respectively.

The values of the rendering area signal may be given by other parameters showing the equivalent values, such as (x1, y1, x2, y2) based on the uppermost leftmost X-coordinate and Y-coordinate and the lowermost rightmost X-coordinate and Y-coordinate of the area to be rendered of the image. Taking into consideration which block the target pixel of the display unit 12 exists in, the block decompression area control unit 16 calculates the following expressions based on the values (x, y, width, height), and the calculated results are substituted.

$$\text{start\_}i = \text{ceil}(x/\text{block width}) \tag{1}$$

$$\text{end\_}i = \text{ceil}(\text{width}/\text{block width}[t\_\text{width}]) \tag{2}$$

$$\text{start\_}j = \text{ceil}(y/\text{block height}) \tag{3}$$

$$\text{end\_}j = \text{ceil}(\text{height}/\text{block height}[t\_\text{height}]) \tag{4}$$

In the case of FIG. 12, the blocks corresponding to the area to be rendered are indicated by the block numbers of "00," "01," "02," "10," "11," and "12," and start_i=0, end_j=3, start_j=0, and end_j=2 are substituted.

Next, a block extraction operation, which corresponds to the block extraction operation 16-2, is performed. In the block extraction operation, it is determined based on the block numbers extracted in step S2 whether a current block (a block currently processed) is included in the area to be rendered. First, the current block is represented by a position i in the main scanning direction and a position j in the sub scanning direction. Whether the current block is a block to be decompressed is determined based on whether the following expressions hold.

$$j < \text{end\_}j (\text{step } S4) \tag{5}$$

$$i < \text{end\_}i (\text{step } S6) \tag{6}$$

That is, in step S3, j=start_j is substituted as a starting position in the sub scanning (vertical in FIG. 12) direction, and in step S4, it is determined whether the condition j<end_j defining the area to be rendered in the sub scanning direction holds.

If the condition holds (that is, "YES" in step S4), it is determined whether the current block is also included in the area to be rendered in the main scanning direction. Specifically, in step S5, i=start_i is substituted as a starting position in the main scanning (horizontal in FIG. 12) direction, and in step S6, it is determined whether the condition i<end_i defining the area to be rendered in the main scanning direction holds.

If the condition holds (that is, "YES" in step S6), the current block is determined to be a block in the area to be rendered, and in step S7, the block extraction unit 16-2 transmits to the block decompression unit 17 a signal instructing the block decompression unit 17 to decompress the current block.

When the decompression of the current block is completed, in step S8, the current block number is incremented by one in the main scanning direction (i=i+1) so as to determine whether the block adjacent to the current block in the main scanning direction is within the area to be rendered. Then, the operation returns to step S6, and steps S6 through S8 are repeated.

If the current block falls outside the range of the area to be rendered in the main scanning direction (that is, "NO" in step S6), all the blocks within the area to be rendered have been decompressed in the line of blocks. Accordingly, the next line of blocks is to be processed. In order to shift to the next line, in step S9, j indicating the number in the sub scanning direction is incremented by one (j=j+1), and the operation returns to step S4. Then, steps S4 through S9 are repeated.

If the current block falls outside the range of the area to be rendered in the sub scanning direction (that is, "NO" in step S4), all the blocks within the area to be rendered have been decompressed in both main scanning and sub scanning directions. Then, in step S10, the rendering enabling signal output unit 16-1 of the block decompression area control unit 16 transmits the rendering enabling signal to the rendering control unit 15.

In step S10, the function of the rendering enabling signal output unit 16-1 is performed. That is, the block decompression area control unit 16 transmits the rendering enabling signal to the rendering control unit 15 before all the blocks of the image data are decompressed after the blocks corresponding to the specified area to be rendered are decompressed. When the rendering enabling signal is transmitted to the rendering control unit 15, the rendering control unit 15 renders on the display unit 12 the blocks corresponding to the specified area to be rendered which blocks are stored in the RAM 4 by the decompressed image storage unit 18.

The block decompression area control unit 16 may transmit the rendering enabling signal at any time before all the blocks of the image data are decompressed after the blocks within the area to be rendered are decompressed. If the block decompression area control unit 16 is set to transmit the rendering enabling signal immediately after the decompression of the blocks within the area to be rendered is completed, the area to be rendered can be rendered on the display unit 12 at the fastest speed. In this case, however, when the user changes the area to be rendered, the speed of response is slow in rendering a newly specified area to be rendered. On the other hand, if the block decompression area control unit 16 is set to transmit the rendering enabling signal immediately before the decompression of all the blocks of the image data is completed, the speed of response is fast in rendering the newly specified area when the user changes the area to be rendered. In this case, however, it takes time to render the initial area to be rendered. Accordingly, the timing of transmitting the rendering enabling signal may be set to an appropriate value by taking these facts into consideration.

After the rendering enabling signal is transmitted to the rendering control unit 15, in step S20, the blocks other than those of the area to be rendered are decompressed, and the operation ends.

Figures 15, 16:
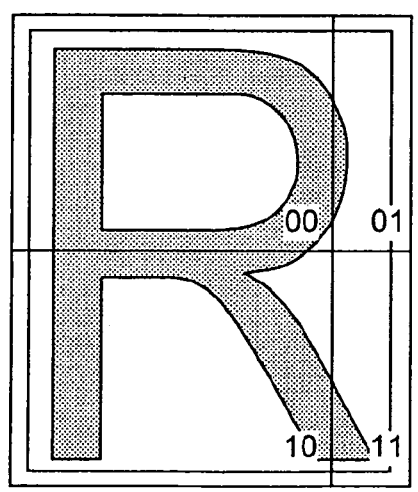
FIG. 15 is a diagram showing the blocks to be decompressed first and blocks to be decompressed later according to an embodiment of the present invention.
FIG. 16 is a diagram showing the image divided in two-dimensional directions in another way according to an embodiment of the present invention.

That is, as shown in FIG. 15, the block decompression unit 17, controlled by the block decompression area control unit 16, first decompresses the blocks corresponding to the specified area to be rendered, and then, decompresses the remaining blocks of the image data.

After decompressing the compressed codes of (or the part of the compressed code corresponding to) the blocks corresponding to the area to be rendered indicated by the rendering area signal supplied from the rendering control unit 15, the block decompression area control unit 16 transmits the rendering enabling signal indicating the completion of the decompression of the compressed codes of the blocks corresponding to the specified area to be rendered to the rendering control unit 15. Then, the image corresponding to the decompressed compressed codes is rendered on the display unit 12. Thus, the compressed codes of the blocks corresponding to the specified area to be rendered are decompressed and rendered before the decompression of all the compressed codes is completed. As a result, it is possible to produce the same effect as if the decompression were performed at higher rates than by the conventional decompression method, thus making it possible to reduce user waiting time in rendering the image.

An embodiment of the image processing apparatus of the present invention is applicable in the case of rendering a relatively large-size image such as a panoramic image, an astronomic image, or a map image on a display unit with a limited rendering region at high speed. For instance, one embodiment of the image processing apparatus of the present invention is applicable in the case of following a path seamlessly on a world map using a computer.

In this embodiment, the blocks including part of the image which part matches the area to be rendered on the display unit 12 are, but are not limited to, those indicated by the block numbers of "00," "01," "02," "10," "11," and "12" (FIGS. 12 and 13).

Figure 17:
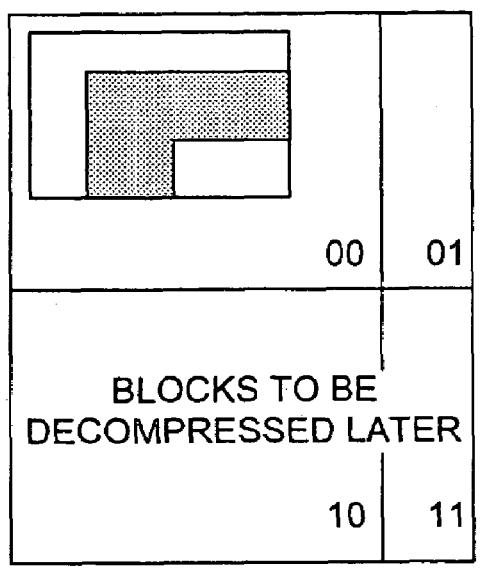
FIG. 17 is a diagram showing the relationship between the part of the image (the area to be rendered) and a block including the part of the image according to an embodiment of the present invention.
Figure 18:
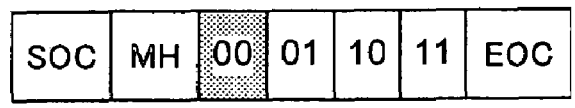
FIG. 18 is a diagram showing the relationship between the area to be rendered and the block in a compressed code according to an embodiment of the present invention.

For instance, a description is given of the operation of rendering the part of the image corresponding to the area to be rendered on the display unit 12 in the case of using a two-dimensionally divided image as shown in FIG. 16. Each block is larger in size in the two-dimensionally divided image of FIG. 16 than in the two-dimensionally divided image of FIG. 7. That is, as shown in FIG. 17, the part of the image, or the area to be rendered, is included in a single block. Referring to FIG. 18, the block indicated by the block number "00" includes the area to be rendered. According to this embodiment, even in the case where the part of the image (the area to be rendered) is included in a single block, the compressed code of the block corresponding to the specified area to be rendered is decompressed and rendered before the decompression of all the blocks of the image data is completed. Therefore, it is possible to produce the same effect as if the decompression were performed at higher rates than by the conventional decompression method, thus making it possible to reduce user waiting time in rendering the image.

Figure 19:
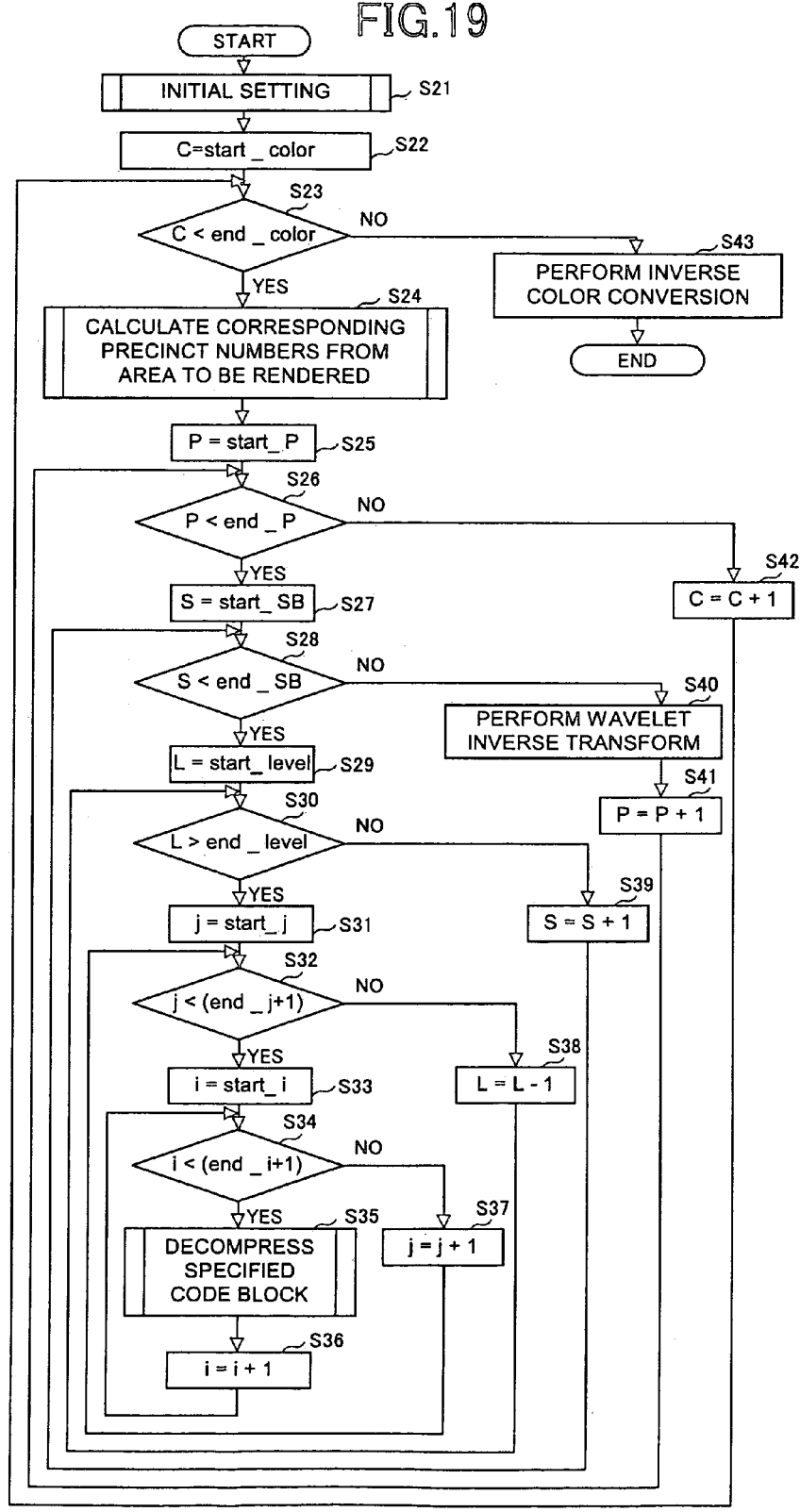
FIG. 19 is a flowchart of a specified block decompressing operation in an image rendering operation according to an embodiment of the present invention.

Next, a description is given, with reference to FIG. 19, of another embodiment of the present invention. The same elements as those of the first embodiment are referred to by the same numerals, and a description thereof is omitted.

As described above in the embodiments, even in the case where the part of the image (the area to be rendered) is included in a single block, the compressed code of the block corresponding to the specified area to be rendered is decompressed and rendered before the decompression of all the blocks of the image data is completed. Therefore, it is possible to produce the same effect as if the decompression were performed at higher rates than by the conventional decompression method, thus making it possible to reduce user waiting time in rendering the image.

However, if the part of the image is extremely small in size compared with the block including the part of the image, the part of the block other than the part of the image is also to be decompressed. Therefore, in terms of high-speed data decompression, there is still room for improvement.

Therefore, this embodiment allows a further reduction in user waiting time in rendering the image in the case where the part of the image is extremely small in size compared with the block including the part of the image.

Figure 20:
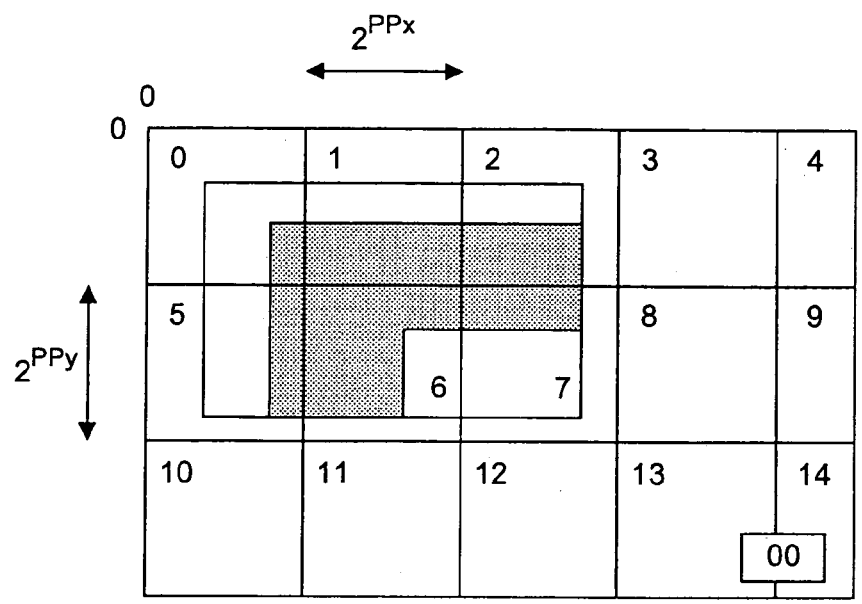
FIG. 20 is a diagram showing the relationship between part of the image (the area to be rendered) and a block including the part of the image according to an embodiment of the present invention.

FIG. 19 is a flowchart of the operation of decompressing a specified block (a specified block decompressing operation) in an image rendering operation according to this embodiment. The specified block decompressing operation in the image rendering operation corresponds to step S7 of the flowchart of FIG. 11. In this case, it is assumed that of the two-dimensionally divided image of FIG. 16, a part or the area to be rendered is extremely small in size compared with the size of the block including the part of the image as shown in FIG. 20.

The block decompression unit 17 that performs the specified block decompression operation successively decompresses packets into which the wavelet transform coefficients divided into sub-bands are converted bit plane by bit plane by entropy coding, thereby decompressing the specified block. The range of decompression is specified by: color component; type of sub-band; decomposition level; the range of code blocks in the sub scanning direction; the range of code blocks in the main scanning direction; and the number of bit planes.

For simplification, in the following description, the code blocks in a specified range are reversibly decompressed, and a description is given, with respect to the number of bit planes, of the effect of the case of decompressing all the bit planes. However, the present invention is not limited to reversible decompression. Therefore, the present invention is also applicable to irreversible decompression by also specifying a range up to a particular bit plane in the routine of decompressing a specified code block of step S35 of FIG. 19.

First, in step S21 of FIG. 19, the routine of step S7 of FIG. 11, in order to decompress a block indicated by the block number of i in the main scanning direction and j in the sub scanning direction, reserves memory necessary for the decompression and sets the start position and the position of the end position plus one of the specified range as shown in the following Table 1 as initial settings.

TABLE 1

|  | START POSITION | END POSITION + 1 |
|---|---|---|
| COLOR COMPONENT | start_color | end_color |
| SUB-BAND TYPE | start_sb | end_sb |
| DECOMPOSITION LEVEL | start_level | end_level |
| CODE BLOCK RANGE IN SUB SCANNING DIRECTION | start_j | end_j + 1 |
| CODE BLOCK RANGE IN MAIN SCANNING DIRECTION | start_i | end_i + 1 |

Then, in step S22, a value C indicating a current color component is set as the value of start_color, and in step S23, it is determined whether the current color component C falls within the range up to the end position (C<end_color). If C<end_color (that is, "YES" in step S23), the operation proceeds to step S24. Normally, in the case of a monochrome image, start_color is set to 0 and end_color is set to 1, and in the case of a color image, start_color is set to 0 and end_color is set to 4.

When the range is specified by the color component, next, in step S24, the number of each corresponding precinct is calculated from the area to be rendered. As previously described, the precinct is a partitioned region having a size of horizontally $2^{PPx}$ and vertically $2^{PPy}$, and the size of the precinct is determined at the time of encoding. Referring to FIG. 20, the block 00 is divided into units of $2^{PPx}$ in the main scanning direction and $2^{PPy}$ in the sub scanning direction from the origin so as to be partitioned into rectangular regions of their respective precinct numbers. The numbers of the precincts where the area to be rendered is mapped are 0, 1, 2, 5, 6, and 7.

In FIG. 19, the loop of steps S25, S26, and S42, which is repeated as many times as the number of precincts, is correctly a double loop performed in both main and sub scanning directions. However, the loop is shown as a single loop to avoid complicating the flowchart of FIG. 19. The loop of steps S25, S26, and S41 is equal in loop operation to the double loop inside the below-described double loop of steps S31, S32, and S38.

When the precinct numbers are determined in step S24, the start number and the end number of the precincts in the main scanning direction are substituted as startup_p=0 and end_p=3 so as to determine constants for controlling the loop.

Next, in step S25, the value of start_p is set in a current precinct number P, and the operation starts at the upper left precinct of the specified block.

Next, in step S26, which is an end condition, it is determined whether the current precinct number P, which is incremented later in step S41, is less than the end number end-p set in step S24 (P<end_p).

If the precinct number P falls within the area to be rendered (that is, "YES" in step S26), in step S27, the sub-band is determined. The sub-band changes successively from LL to HL to LH to HH and successively takes the values of the wavelet transform coefficients. That is, in step S27, start_sb is specified for a variable S indicating a current sub-band.

Next, in step S28, it is determined whether the current sub-band S falls within the range of decompression (S<end_sb). If it is determined that S<end_sb (that is, "YES" in step S28), in step S29, the decomposition level is specified.

Figure 21:
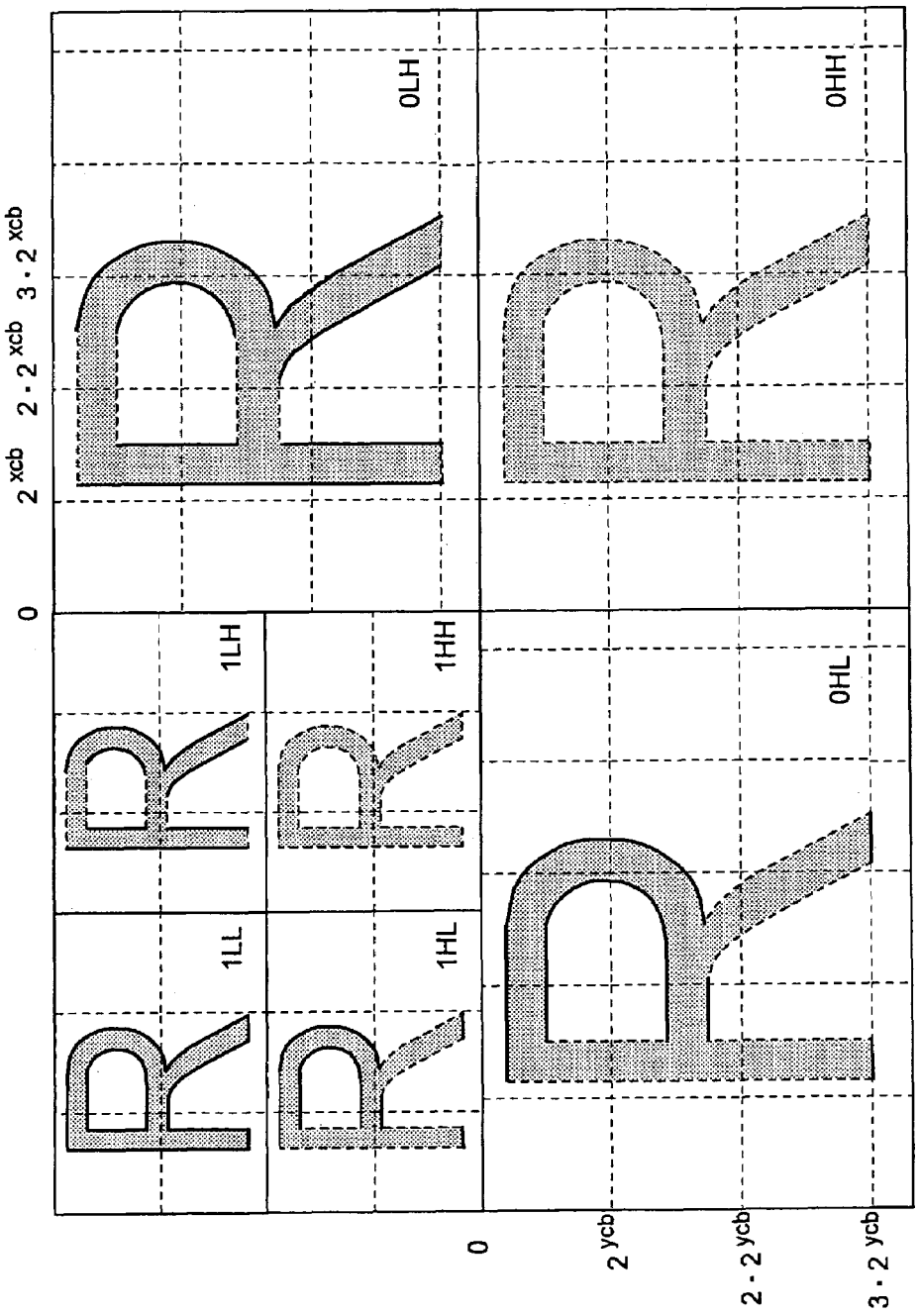
FIG. 21 is a diagram showing a division of sub-band coefficients into decomposition levels and code blocks according to an embodiment of the present invention.

In step S29, start_level is specified for a variable L indicating a current decomposition level. FIG. 21 is a diagram showing a division of sub-band coefficients into decomposition levels and code blocks. In the case of FIG. 21, the decomposition level is of a single hierarchy. Accordingly, start_level is set to 1 (start_level=1) and end_level is set to −1 (end_level=1) so that the decompression starts at a higher decomposition level.

Next, in step S30, it is determined whether the current decomposition level L falls within the range of decompression (L>end_level). If it is determined that L>end_level (that is, "YES" in step S30), in step S31, the code block is specified.

In step S31, the number of a current code block in the sub scanning direction and the number of the current code block in the main scanning direction are defined as j and i, respectively, and start_j is specified for a variable j indicating the number of the current code block in the sub scanning direction.

Next, in step S32, it is determined whether the variable j falls within the range of decompression (j<(end_j+1)). If it is determined that j<(end_j+1) (that is, "YES" in step S32), in step S33, start_i is specified for a variable i indicating the number of the current code block in the main scanning direction.

Next, in step S34, it is determined whether the variable i falls within the range of decompression (i<(end_i+1)). If it is determined that i<(end_i+1) (that is, "YES" in step S34), the operation proceeds to step S35.

In step S35, the specified code block is decompressed. The division of sub-bands coefficients into code blocks is shown in FIG. 21. Each sub-band is divided, with its uppermost leftmost point being the origin, into rectangular regions each having a size of horizontally $2^{xcb}$ (in the X-direction) and vertically $2^{ycb}$ (in the Y-direction). Each rectangular region is referred to as a code block. The code blocks serve as units of encoding. Accordingly, decompression, which is an inverse transform, is performed based on the units of code blocks.

When the decompression of the specified code block is completed, in step S36, the number i in the main scanning direction is incremented by one (i=i+1) so as to specify the adjacent code block in the main scanning or horizontal direction. Then, the operation returns to step S34. Steps S34 through S36 are repeated until the decompression of the code blocks in the main scanning direction is completed for the number j (that is, "NO" in step S34).

When "NO" in step S34, in step S37, the number j in the sub scanning direction is incremented by one so as to specify the next code block in the sub scanning direction in the area to be rendered. Then, the operation returns to step S32. Steps S32 through S37 are repeated until the decompression of the code blocks is completed with respect to the sub scanning direction, that is, the decompression of the code blocks of the current decomposition level within the range of decompression is completed (that is, "NO" in step S32).

When "NO" in step S32, next, in step S38, in order to proceed to the decompression of the code blocks included in a decomposition level lower than the current decomposition level, the variable L indicating the current decomposition level is decremented by one (L=L−1), and the operation returns to step S30. Steps S30 through S38 are repeated until the decompression of the code blocks of the decomposition levels of the current sub-band within the range of decompression is completed (that is, "NO" in step S30).

When "NO" in step S30, next, in step S39, in order to proceed to the decompression of the code blocks included in the sub-band next to the current sub-band, the type of sub-band is changed to the next type (S=S+1), and the operation returns to step S28. Steps S28 through S39 are repeated until the decompression of the code blocks of the sub-bands of the current precinct within the range of decompression is completed (that is, "NO" in step S28).

By this time, all the wavelet transform coefficients for the current precinct in the compressed code have been decompressed. Accordingly, at this stage, it is possible to perform a wavelet inverse transform, and in step S40, a wavelet inverse transform is performed.

Next, in step S41, in order to proceed to the decompression of the code blocks included in the precinct next to the current precinct, the precinct number P is changed to the next number (P=P+1), and the operation returns to step S26. Steps S26 through S42 are repeated until the decompression of the code blocks of the sub-bands of the precincts of the current color component within the range of decompression is completed (that is, "NO" in step S26).

Next, in step S42, in order to proceed to the decompression of the code blocks included in the color component next to the current color component, the color component value C is changed to the next value (C=C+1), and the operation returns to step S23. Steps S23 through S42 are repeated until the decompression of the code blocks of the sub-bands of the precincts of the color components within the range of decompression is completed (that is, "NO" in step S23).

By this time, all the color components of the precincts in the compressed code have been decompressed. Accordingly, it is possible to perform inverse color conversion, and in step S43, inverse color conversion is performed.

Thereby, the specified block decompressing operation in the image rendering operation according to the second embodiment ends.

Accordingly, the decompression of the compressed code of the block including the area to be rendered is performed with respect to the precincts including the area to be rendered. Therefore, a code block that does not include the area to be rendered is not decompressed. Thus, it is possible to further reduce user waiting time in rendering the image in the case where the area to be rendered is extremely small in size compared with the block including the area to be rendered.

Next, a description is given below, with reference to FIG. 22, of another embodiment of the present invention. The same elements as those of the previously described embodiments are referred to by the same numerals, and a description thereof is omitted.

Figure 22:
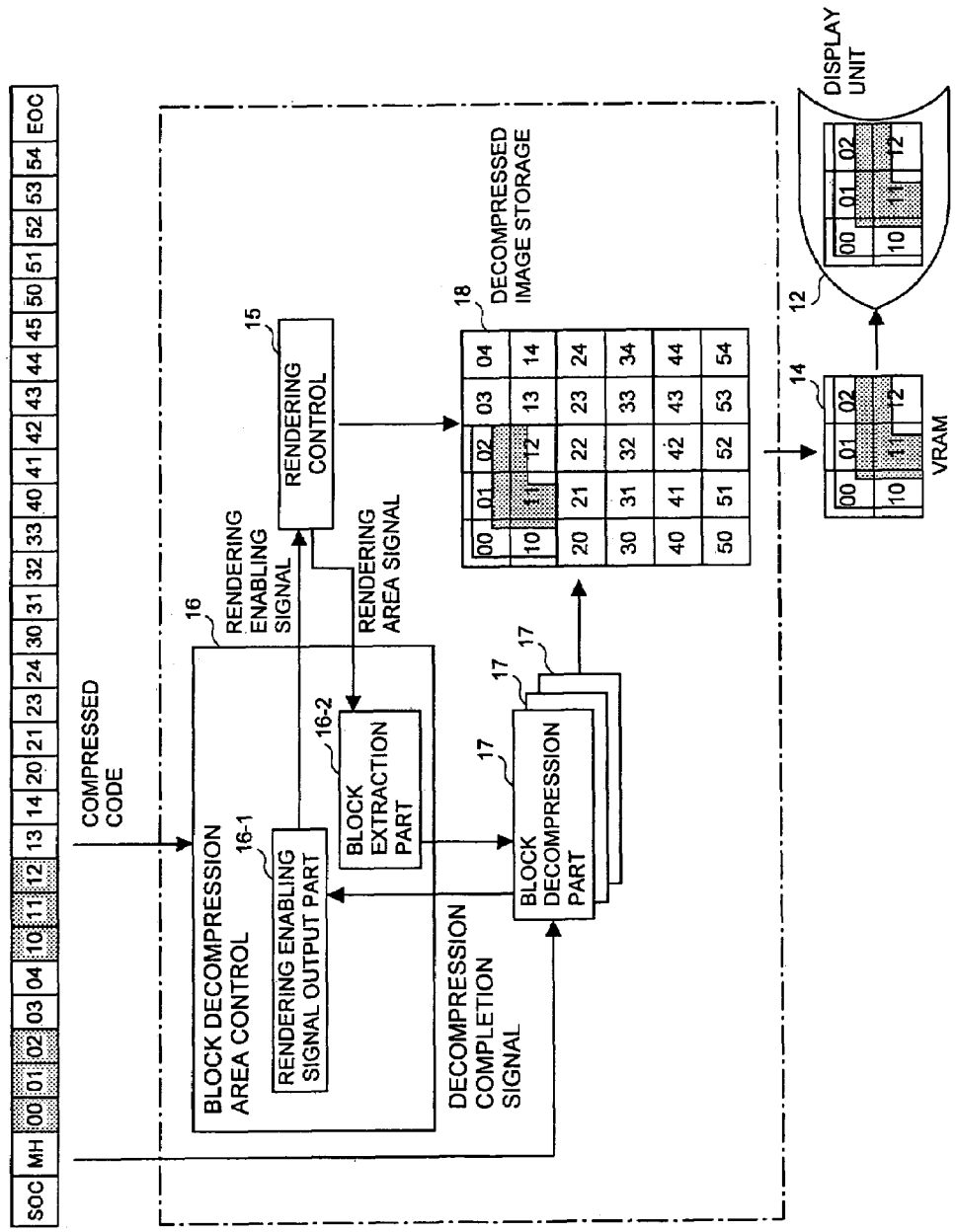
FIG. 22 is a functional block diagram showing a configuration of the image display apparatus according to another embodiment of the present invention.

FIG. 22 is a functional block diagram showing a configuration of the image display apparatus 1 according to this embodiment. Referring to FIG. 22, the configuration of the image display apparatus 1 of this embodiment is different from that of the first embodiment in that the image display apparatus 1 of this embodiment includes a plurality of block decompression parts 17.

The specified block decompressing operation (step S7 of FIG. 11; the operation of FIG. 19) is performed in parallel in the block decompression parts 17. For instance, if the number of block decompression units 17 is three, and the blocks including the area to be rendered are those indicated by the block numbers of "00," "01," "02," "10," "11," and "12" (FIG. 12), each of the three block decompression units 17 decompresses two blocks.

In this case, in determining whether all the blocks in the area to be rendered have been decompressed (step S4 of FIG. 11), the synchronization determination operation of determining whether each block decompression unit 17 has completed the decompression is also performed.

As a result, the block can be decompressed at higher speed, thus allowing further reduction in user waiting time in rendering the image.

Next, a description is given, with reference to FIGS. 23 through 39, of still another embodiment of the present invention. The same elements as those of the embodiments described above are referred to by the same numerals, and a description thereof is omitted.

Figure 23:
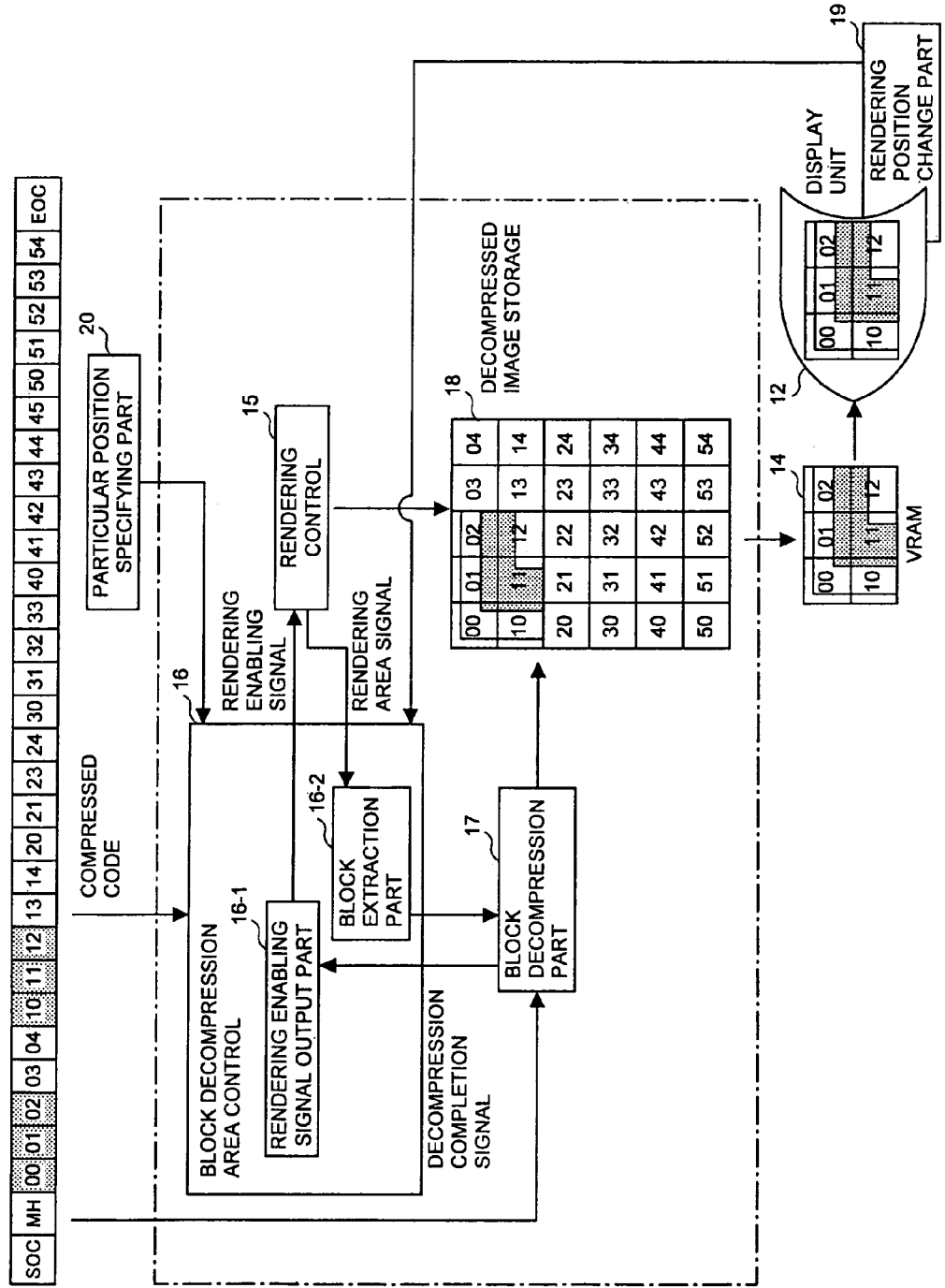
FIG. 23 is a functional block diagram showing a configuration of the image display apparatus according to another embodiment of the present invention.

FIG. 23 is a functional block diagram showing a configuration of the image display apparatus 1 according to this embodiment of the present invention. Referring to FIG. 23, the image display apparatus 1 of the embodiment further includes a rendering position change unit 19 and a particular position specifying unit 20 in addition to its configuration shown in FIG. 10.

According to the embodiment, the CPU 2 realizes the function of the rendering position change unit 19 and the function of the particular position specifying unit 20 by operating based on the computer software. An expatiation is given below of the rendering position change unit 19 and the particular position specifying unit 20, which are one mode of a rendered image change instruction unit of the image display apparatus 1. The rendered image change instruction unit gives an instruction to change the area to be rendered in the rendering region of the display unit 12.

The rendering position change unit 19 changes the area to be rendered in the rendering region of the display unit 12. In one embodiment, the rendering position change unit 19 includes scroll bars for moving a rendering screen vertically and horizontally, a random access part that allows a movement to any position by a single operation, and a hand tool that allows movements in the eight directions of up, down, right, left, upper right, upper left, lower right, and lower left from a currently rendered partial image in order to render another partial image. One of the scroll bars, the random access part, and the hand tool is selected at the user's request.

A description is given of two installations of the randomly accessed part. In the first installation, two windows may be employed. In the first window, the entire image at the time of decompressing the entire compressed code is rendered in a rendering region, being reduced in size as required in accordance with the size of the rendering region, so that a user can specify any block of the compressed code. Meanwhile, in the second window, the decompressed image of an area specified by the user in the first window is rendered. In the second installation, the two windows of the first installation may be provided in the same rendering region. Initially, the entire image at the time of decompressing the entire compressed code is rendered in the rendering region. Then, every time the user specifies any area, the rendering region is updated successively so that the decompressed image of the specified area is rendered in the rendering region. For instance, in the case of a PDA, which is commonly formed of a single window at present, the second installation is commonly employed. On the other hand, in the case of a personal computer, which commonly employs a multi-window configuration, each of the first and second installations is commonly employed.

When the rendering position change unit 19 supplies the block decompression area control unit 16 with a signal indicating that the area to be rendered has been changed or a new area has been specified as the area to be rendered, the block decompression area control unit 16 supplies the block decompression unit 17 with a block (or blocks) corresponding to the (new) area to be rendered. Then, the block decompression unit 17 first decompresses each block corresponding to the area to be rendered.

After completing the decompression of each block corresponding to the area to be rendered, the block decompression unit 17 supplies the rendering enabling signal output unit 16-1 of the block decompression area control unit 16 with a decompression completion signal that indicates the completion of the decompression. Receiving the decompression completion signal, the rendering enabling signal output unit 16-1 of the block decompression area control unit 16 outputs to the rendering control unit 15 a rendering enabling signal indicating that it is possible to render the specified (new) area to be rendered.

The particular position specifying unit 20 specifies a particular position of the image to be rendered so that the area to be rendered is changed to a new area specified by the particular position. The particular position specifying unit 20 may be realized in a variety of modes. For instance, the values indicating the initial position or block number(s) of the area to be rendered (a block or blocks to be decompressed) may be prerecorded in an initial setting file. Then, when the apparatus 1 operates initially, the initial position or block number(s), which indicates the area to be rendered initially, is read from the initial setting file so that the initial position is determined. Alternatively, instead of configuring such an initial setting file, the particular position of the image may be specified by setting the rule that the initial position is the upper left position of the image to be decompressed.

When the particular position specifying unit 20 supplies the block decompression area control unit 16 with a signal indicating that the particular position of the image to be rendered has been specified, the block decompression region control unit 16 supplies the block decompression unit 17 with the compressed code of each block corresponding to the specified area to be rendered (the specified particular position) on the display unit 12. Then, the block decompression unit 17 first decompresses the compressed code of each block corresponding to the specified area to be rendered.

After completing the decompression of (the compressed code of) each block corresponding to the specified area to be rendered, the block decompression unit 17 supplies the rendering enabling signal output unit 16-1 of the block decompression area control unit 16 with a decompression completion signal that indicates the completion of the decompression. Receiving the decompression completion signal, the rendering enabling signal output unit 16-1 of the block decompression area control unit 16 outputs to the rendering control unit 15 a rendering enabling signal indicating that it is possible to render the specified area to be rendered.

Next, an expatiation is given below, with reference to the flowchart of FIG. 24, of the flow of a block decompression area control operation performed by the block decompression area control unit 16 according to one embodiment.

In the following description, the operation of rendering the part of the image of FIG. 7 which part corresponds to the area to be rendered on the display unit 12 as shown in FIG. 12 is taken as an example as in the first embodiment.

Figure 24:
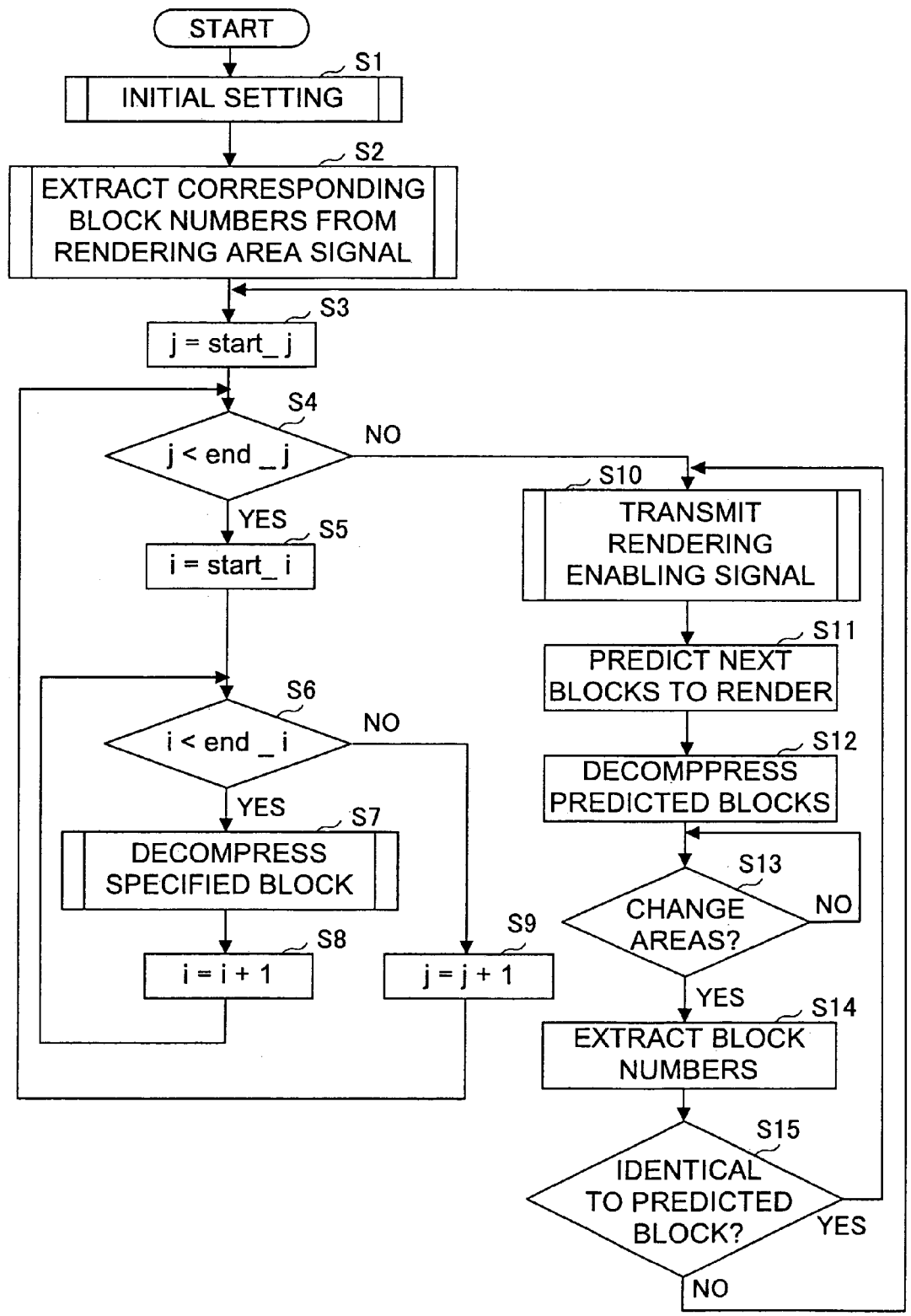
FIG. 24 is a flowchart of an image rendering operation according to an embodiment of the present invention.

Referring to FIG. 24, the block decompression area control operation of this embodiment basically follows the same steps as that of an embodiment described above (FIG. 11) from step S1 to step S10. In step S1 of FIG. 21, the main header information of the compressed code is read so that information such as vertical and horizontal image sizes, the number of blocks in each of the vertical and horizontal directions, a block size, bit depths, color components, the number of hierarchies, and a sub sampling rate is obtained from the main header information. Further, the type of the display position change unit 19 (any of the scroll bars, the randomly accessed part, or the hand tool) and the mode of the particular position specifying unit 20 are also obtained. At this point, the compressed code may be read up to its end (EOC).

Thereafter, the same operation as in the first embodiment of FIG. 11 is performed, and when all the blocks within the area to be rendered have been decompressed (that is, "NO" in step S4), the operation proceeds to step S10, where the rendering enabling signal indicating that the decompression of the blocks corresponding to the specified area to be rendered is completed so that it is possible to render the specified area to be rendered is transmitted to the rendering control unit 15. Thus, the function of the rendering enabling signal output unit 16-1 is performed. That is, the block decompression area control unit 16 transmits the rendering enabling signal to the rendering control unit 15 before all the blocks of the image data are decompressed after the blocks corresponding to the specified area to be rendered are decompressed. When the rendering enabling signal is thus transmitted to the rendering control unit 15, as shown in FIG. 25, the rendering control unit 15 renders on the display unit 12 the blocks that corresponds to the specified area to be rendered and are stored in the RAM 4 by the decompressed image storage unit 18.

According to this embodiment, after the rendering enabling signal is output to the rendering control unit 15, in step S11 of FIG. 24, a rendering block prediction operation of predicting the next blocks to be rendered is performed.

The contents of the rendering block prediction operation differ among, for instance, the case where the block specified by the user has already been decompressed, the case where a rendering position (a position to be rendered on the image) is specified by the user, and the case where no rendering position is specified by the user. Accordingly, an expatiation is given below, case by case, of the rendering block prediction operation.

[Case 1: Where Pixel-by-pixel Scrolling Using the Scroll Bars is Completed]

Figure 26A:
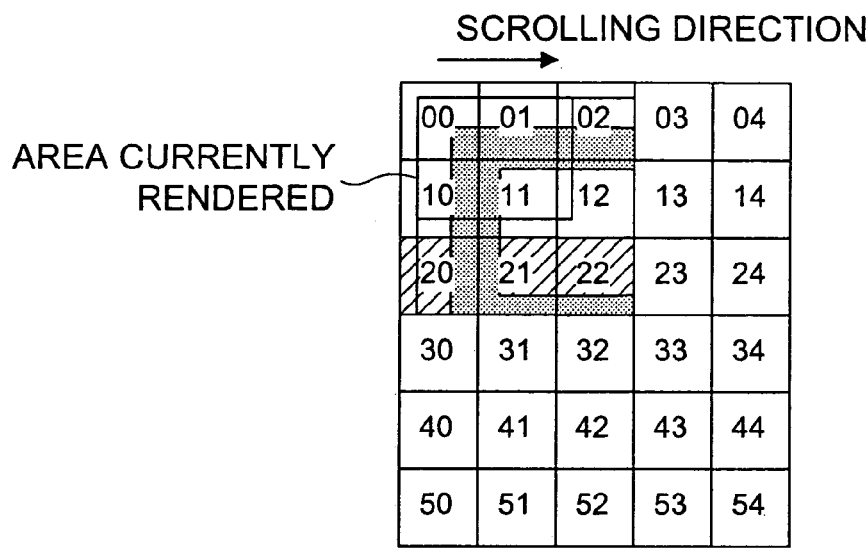
FIGS. 26A and 26B are diagrams showing predictions in the case of horizontal scrolling and vertical scrolling, respectively, according to an embodiment of the present invention.
Figure 26B:
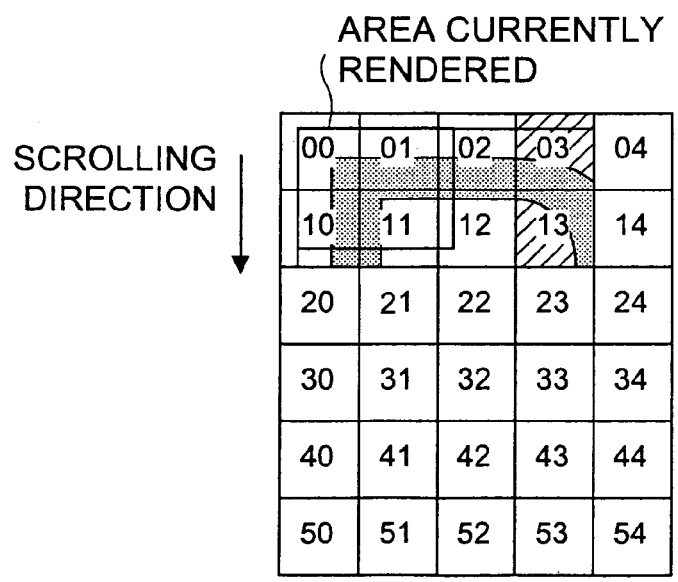

When the user has given an instruction as to scrolling using the scroll bars, and the scrolling has been performed pixel by pixel (using pixels as scrolling units), the blocks existing in a direction perpendicular to the direction in which the scrolling has been performed are predicted to be the next blocks to be rendered in the rendering region of the display unit 12 (as the area to be rendered). FIGS. 26A and 26B are diagrams showing predictions in the case of horizontal scrolling and vertical scrolling, respectively. Referring to FIG. 26A, when scrolling has been performed pixel by pixel in a horizontal direction, the hatched blocks "20," "21," and "22" existing in the direction perpendicular to the horizontal direction are predicted to be the next blocks to be rendered in the rendering region. On the other hand, referring to FIG. 26B, when scrolling has been performed pixel by pixel in a vertical direction, the hatched blocks "03," and "13" existing in the direction perpendicular to the vertical direction are predicted to be the next blocks to be rendered in the rendering region.

This is, because the scroll bars have the following operating characteristics. That is, scrolling can be performed in either a vertical direction or a horizontal direction by a single operation, and in the case of pixel-by-pixel scrolling (hereinafter, pixel scrolling), it can be recognized with certainty that the target area to be rendered is getting closer although pixel scrolling is slow in operation. In the case of pixel scrolling, it can be confirmed with the highest reliability whether the area currently rendered on the display unit 12 has reached the area of interest of the user. Accordingly, it is less probable that scrolling is to be performed in the same direction as it has been performed, and it is more probable that scrolling is to be performed in a direction perpendicular to the direction in which it has been performed. Based on this fact, the next blocks to be rendered are predicted.

[Case 2: Where Page-by-page Scrolling Using the Scroll Bars is Completed]

Figure 27:
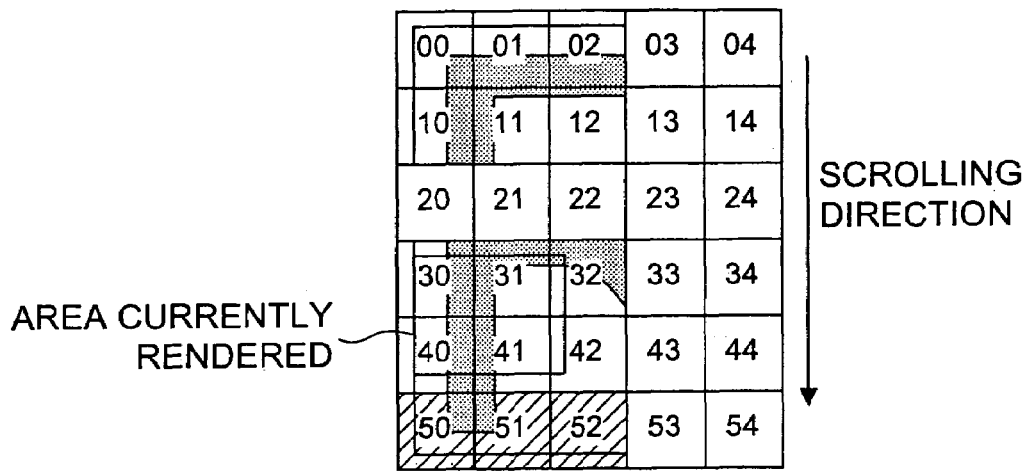
FIG. 27 is a diagram showing a first prediction in the case of page-by-page scrolling according to an embodiment of the present invention.
Figure 28:
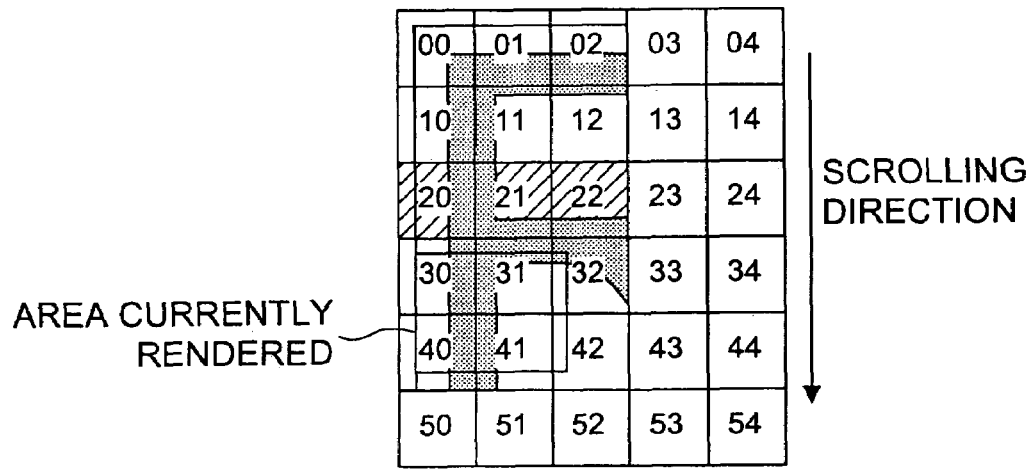
FIG. 28 is a diagram showing a second prediction in the case of page-by-page scrolling according to an embodiment of the present invention.

When the user has given an instruction as to scrolling using the scroll bars, and the scrolling has been performed page by page (using pages as scrolling units), the blocks existing in the same direction as the scrolling has been performed are predicted to be the next blocks to be rendered in the rendering region. In this case, each page corresponds to one area to be rendered. FIGS. 27 and 28 are diagrams showing first and second predictions, respectively, in the case of page-by-page scrolling (hereinafter, page scrolling). Referring to FIG. 27, according to the first prediction, when scrolling has been performed page by page in the vertical (downward) direction, the hatched blocks "50," "51," and "52" existing ahead in the vertical scrolling direction from the currently rendered area (an area that has been specified as the area to be rendered and is currently being rendered) are predicted to be the next blocks to be rendered. Referring to FIG. 28, according to the second prediction, when scrolling has been performed page by page in the vertical (downward) direction, the hatched blocks "20," "21," and "22" existing between the initial rendering position (initially rendered area) and the current rendering position (currently rendered area) to which the scrolling has been performed from the initial rendering area are predicted to be the next blocks to be rendered in the rendering region.

This is because page scrolling, although fast in operation, can make only a rough movement to the target area to be rendered, so that generally, the movement made by page scrolling is finely adjusted by a subsequent movement to the adjacent previous or next page or by subsequent pixel scrolling. That is, in the case of page scrolling, the next blocks to be rendered are predicted based on the page-scrolling characteristic that a movement to the user's target area to be rendered is made by first making a rough movement and then making a fine movement by fine adjustment in the same direction.

[Case 3: Where the Random Access Part is Employed]

In the case of employing the randomly accessed part, the blocks existing around the center of the image are predicted to be the next blocks to be rendered in the rendering region. FIG. 29 is a diagram showing a prediction in the case of employing the random access part. Referring to FIG. 29, the hatched blocks "21," "22," "23," "31," "32," and "33" existing around the center of the image are predicted to be the next blocks to be rendered in the rendering region.

The random access part has the characteristic of allowing a movement to any position by a single operation. Generally, it is difficult to predict the next position to be specified by the user. However, in the case of a digital camera, it is common that the center of a subject image is positioned around the center of the area to be rendered. Accordingly, based on this assumption, the next blocks to be rendered are thus predicted in the case of employing the randomly accessed part.

[Case 4: Where the Hand Tool is Employed]

In the case of employing the hand tool, the blocks adjacent to the blocks including a currently rendered image are predicted to be the next blocks to be rendered in the rendering region. FIG. 30 is a diagram showing a prediction in the case of employing the hand tool. Referring to FIG. 30, in this case, the hatched blocks "03," "13," "20," "21," "22," and "23" that are adjacent to the blocks including a currently rendered image in horizontal, vertical, and diagonal directions are predicted to be the next blocks to be rendered in the rendering region. That is, the blocks adjacent to (a group of blocks in the eight directions of up, down, right, left, upper right, upper left, lower right, and lower left are predicted to be the next blocks to be rendered in the rendering region.

The next blocks to be rendered are predicted based on the characteristic that the hand tool allows movements in the eight directions of up, down, right, left, upper right, upper left, lower right, and lower left from the currently rendered partial image in order to render another partial image.

Thus, in the case where the area to be rendered is changed from one area to another on the image based on the rendering position change unit 19, the next blocks to be rendered are predicted based on the characteristic of the rendering position change unit 19. As a result, the accuracy of prediction can be improved.

[Case 5: Where the Particular Position Specifying Part 20 is Employed]

In the case of employing the particular position specifying unit 20, the blocks that satisfy a predetermined requirement concerning the particular position specifying unit 20 are predicted to be the next blocks to be rendered in the rendering region. As a result, the accuracy of prediction can be improved. The particular position specifying unit 20 can be realized in a variety of modes, some of which are illustrated in the following.

According to a first mode, a particular position (for instance, a punch hole) is predetermined through the particular position specifying unit 20 by the user. FIG. 31 is a diagram showing a prediction in the case of employing the particular position specifying unit 20 according to the first mode. Referring to FIG. 31, the hatched blocks "20" and "30" existing in the particular position (the positions of the punch holes) are predicted to be the next blocks to be rendered in the rendering region. This is because such punch holes are often used to check skew or erased.

According to a second mode, a particular position corresponding to the results of statistically analyzing the history of usage by the user is specified by the particular position specifying unit 20. For instance, the part analyzed to be frequently used based on the history of usage by the user may be determined as the particular position. FIG. 32 is a diagram showing a prediction in the case of employing the particular position specifying unit 20 according to the second mode. FIG. 32 assumes the case where the lower right part of the image is frequently used by the user. Referring to FIG. 32, in this case, the hatched blocks "42," "43," "44," "52," "53," and "54" existing in the particular position (lower right part) are predicted to be the next blocks to be rendered in the rendering region. This is because the lower right part of the image corresponds to the end of a document where the conclusion is described so that it is believed that the user constantly refers to this part.

Figures 33, 34:
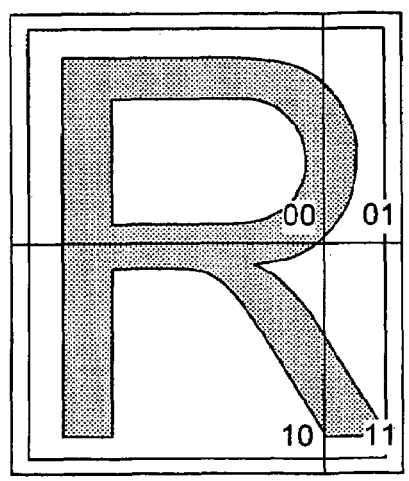
FIG. 33 is a diagram showing a prediction in the case of employing the particular position specifying part according to a third mode according to an embodiment of the present invention.
FIG. 34 is a diagram showing the image divided in two-dimensional directions according to an embodiment of the present invention.

According to a third mode, a particular position corresponding to the frequency of occurrence of a high-frequency component in the compressed code is specified by the particular position specifying unit 20. For instance, the part where the frequency of occurrence of a high-frequency component is high may be determined as the particular position. FIG. 33 is a diagram showing a prediction in the case of employing the particular position specifying unit 20 according to the third mode. FIG. 33 assumes the case where the frequency of occurrence of a high-frequency component is high in the lower part of the image. Referring to FIG. 33, in this case, the hatched blocks "41," "42," "43," "51," "52," and "53" existing in the particular position (lower part) are predicted to be the next blocks to be rendered in the rendering region. The frequency of occurrence of a high-frequency component in the compressed code may be determined by obtaining the amount of codes of the high-frequency sub-band coefficients (LH, HL, and HH) of each hierarchy by reading the amount of codes of each sub-band described in the header part of each block. The part of the image where the frequency of occurrence of a high-frequency component thus obtained is high is considered to be the focused-on part of the entire image, so that it is believed that the user constantly refers to this part.

Thus, the rendering block prediction operation of step S11 is performed.

When the next blocks to be rendered in the rendering region are thus predicted in step S11, next, in step S12, the predicted blocks are decompressed.

That is, the function of the predicted block decompression part of the image display apparatus 1 is preformed by steps S11 and S12.

Thereafter, in step S13, it is determined whether there is an instruction to change the area to be rendered in the rendering region to a new area. If an instruction has been given to change the area to be rendered in the rendering region (that is, "YES" in step S13), in step S14, the blocks corresponding to the new area to be rendered are extracted, and in step S15, the extracted blocks and the predicted blocks are compared.

If the extracted blocks are identical to the predicted blocks (that is, "YES" in step S15), the operation returns to step S10 so that the rendering enabling signal indicating that the decompression of the blocks corresponding to the specified area to be rendered is completed so that it is possible to render the specified area to be rendered is output to the rendering control unit 15 since the decompression of the extracted blocks has been completed. Thus, the function of the changed image rendering part of the image display apparatus 1 is performed.

On the other hand, if the extracted blocks are different from the predicted blocks (that is, "NO" in step S15), the operation returns to step S3 so that steps S3 through S10 are performed on the extracted blocks. Thus, the function of the changed image rendering part of the image display apparatus 1 is performed.

When an instruction to change the area to be rendered in the rendering region to a new area is given after the compressed codes of (or the part of the compressed code corresponding to) the blocks corresponding to the area to be rendered is decompressed and the image corresponding to the decompressed compressed code is rendered, the compressed code of the blocks corresponding to the new area to be rendered after the change based on the instruction are decompressed, and the image corresponding to the decompressed compressed code is rendered in the rendering region. Thereby, even in the case of changing the area to be rendered, the image can be displayed at high speed in accordance with the change.

Further, if the blocks that are predicted and have their compressed codes decompressed by the predicted block decompression part are identical to the blocks corresponding to the new area to be rendered after the change based on the instruction given by the rendering position change unit 19 or the particular position specifying unit 20, the predicted and decompressed blocks are rendered in the rendering region of the display unit 12. Thus, the next blocks to be decompressed as a result of the change of the area to be rendered in the rendering region are predicted and decompressed. As a result, if the predicted blocks are identical to the blocks corresponding to the new area to be rendered after the change, the image corresponding to the new area to be rendered can be rendered without newly decompressing the blocks corresponding to the new area to be rendered. Accordingly, image rendering speed in the case of changing the area to be rendered can be further increased.

The image processing apparatus of one embodiment of the present invention is applicable in the case of rendering a relatively large-size image such as a panoramic image, an astronomic image, or a map image on a display unit with a limited display area at high speed. For instance, the image processing apparatus of one embodiment of the present invention is applicable in the case of following a path on a world map seamlessly using a computer.

In this embodiment, the blocks including the part of the image corresponding to the area to be rendered on the display unit 12 are, but are not limited to, those indicated by the block numbers of "00," "01," "02," "10," "11," and "12" (FIGS. 12 and 13).

Figure 35:
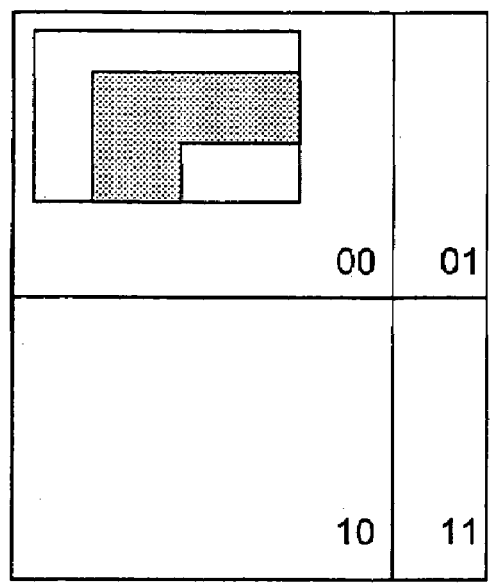
FIG. 35 is a diagram showing the relationship between part of the image (the area to be displayed) and a block including the part of the image according to an embodiment of the present invention.
Figure 36:
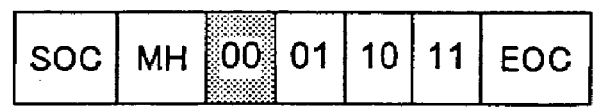
FIG. 36 is a diagram showing the relationship between the area to be rendered and the block in a compressed code according to an embodiment of the present invention.

For instance, a description is given of the operation of rendering the part of the image corresponding to the area to be rendered on the display unit 12 in the case of using a two-dimensionally divided image as shown in FIG. 34. Each block is larger in size in the two-dimensionally divided image of FIG. 34 than in the two-dimensionally divided image of FIG. 7. That is, as shown in FIG. 35, part of the image, or the area to be rendered, is included in a single block. Referring to FIG. 36, the block indicated by the block number "00" includes the area to be rendered. According to this embodiment, even in the case where the part of the image (the area to be rendered) is included in a single block, the compressed code of the block corresponding to the specified area to be rendered is decompressed and rendered before the decompression of all the blocks of the image data is completed. Therefore, it is possible to produce the same effect as if the decompression were performed at higher rates than by the conventional decompression method, thus making it possible to reduce user waiting time in rendering the image.

According to the embodiments of the present invention, the blocks are formed by dividing the image in two-dimensional directions as shown in FIGS. 7 and 16 or 34. Alternatively, the blocks may be formed by dividing the image in a one-dimensional direction so that each block has the same width (horizontal dimension) or height (vertical dimension) as the image.

Further, according to the embodiments of the present invention, the color image data whose pixels are each composed of R, G, and B color components each of 8 bits is decoded and rendered. However, embodiments of the present invention is also applicable in the case where the luminance of each color component is expressed by bit numbers other than 8 bits, such as 4 bits, 10 bits, and 12 bits. Further, embodiments of the present invention is also applicable in the case of encoding color image data represented by other color spaces such as CMYK, or a monochrome image. Furthermore, embodiments of the present invention is also applicable in the case of encoding multi-level information indicating the state of each pixel of an image region. For instance, embodiments of the present invention is applicable in the case of expressing each color of each pixel by an index value for a color table and encoding the index value.

Further, according to the embodiments of the present invention, the original image is divided into tiles. However, even if the original image is not divided into tiles, using a precinct or a code block in the JPEG2000 algorithm as a rectangular region (a block) can produce the same effect as if decompression were performed at higher rates than by the conventional decompression method as in the case where the original image is divided into tiles. This allows reducing user waiting time in rendering the image. Further, by making the block (tile, precinct, or code block), which is a unit of image division, identical to a value defined by a profile, interconnectability can be secured between the apparatuses having the same profile.

Further, according to the embodiments of the present invention, the image display apparatus 1 of the present invention is applied to a personal computer. However, the image display apparatus 1 is also applicable to an information terminal apparatus such as a PDA or a mobile phone. FIG. 37 is a schematic plan view of a PDA 30. Referring to FIG. 37, part of a compressed code is rendered on a display unit 31 of the PDA 30. The PDA 30 allows access to any position by moving a rendering position vertically and horizontally using a stylus pen 32 attached to the PDA 30, by changing the scale operating a reduction or enlargement icon, or by operating a scroll icon or a hand tool icon.

Figure 38:
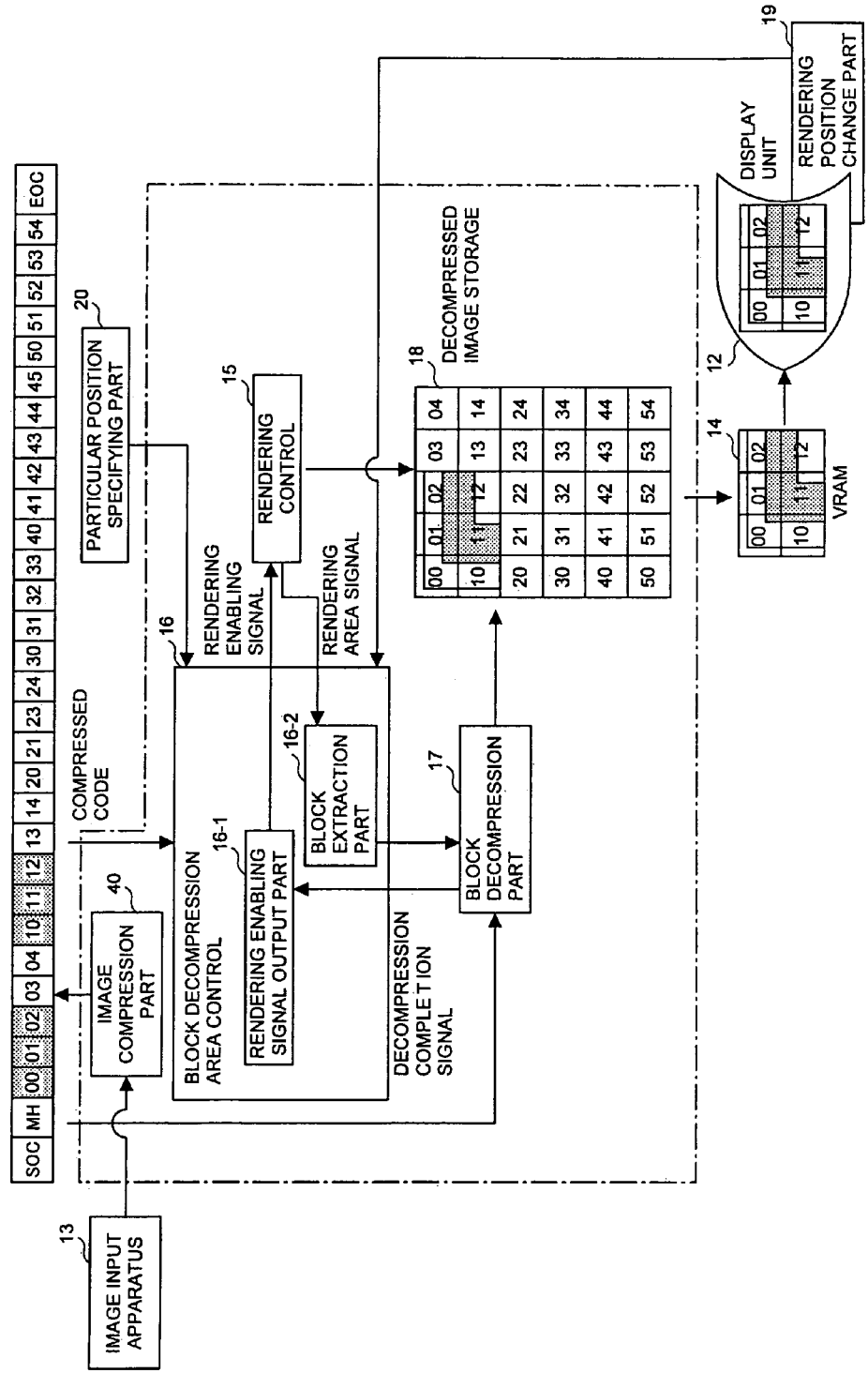
FIG. 38 is a functional block diagram showing a configuration of the image display apparatus with an image compression part according to another embodiment of the present invention.

Further, according to the embodiments of the present invention, the image display apparatus 1 of the present invention stores in the HDD 6 the compressed code downloaded via the network 9 from the server computer 100. Alternatively, as shown in FIG. 38, the image display apparatus 1 may include an image compression unit 40 that divides image data input from an image input apparatus 13 such as scanner into a plurality of blocks so as to compress and encode the image data block by block. The image display apparatus 1 of FIG. 38 is based on the configuration of FIG. 23 according to the fourth embodiment for convenience of description. However, the above-described configuration may be realized based on the configuration of the image display apparatus 1 according to any of the other embodiments.

In each embodiment, the server computer 100 transmits all specified image data to the image display apparatus 1 so that the image display apparatus 1 extracts the blocks or precincts corresponding to the area to be rendered. Alternatively, the image display apparatus 1 may transmit information on the blocks or precincts corresponding to the extracted area to be rendered to the server computer 100 so that the server computer 100 transmits the image data corresponding to the blocks or precincts corresponding to the area to be rendered to the image display apparatus 1. That is, the server computer 100, which is a server, may calculate and extract the blocks or precincts corresponding to the image area specified by the image display apparatus 1, which is a client computer. Specifically, as shown in FIG. 39, the rendering enabling signal output unit 16-1 of the block decompression area control unit 16 may be provided in the image display apparatus 1 and the block extraction unit 16-2 of the block decompression area control unit 16 may be provided in the server computer 100. The image display apparatus 1 transmits a rendering area signal and the name of image data supplied from the rendering control unit 15 to the server computer 100 via a communication part 51 of the image display apparatus 1. When the server computer 100 receives the rendering area signal, the block extraction unit 16-2 extracts the corresponding block numbers from the image data, and transmits the compressed codes of the extracted block numbers to the image display apparatus 1 via a communication unit 52 of the server computer 100. Referring to FIG. 39, the rendering enabling signal output unit 16-1 and the communication unit 51 forms a client-side block decompression area control unit, and the block extraction unit 16-2 and the communication unit 52 forms a server-side block decompression area control part.

The present invention is not limited to the specifically disclosed embodiments, and variations and modifications may be made without departing from the scope of the present invention.

The present application is based on Japanese priority applications No. 2002-273631 and No. 2002-273997, both filed on Sep. 19, 2002, the entire contents of which are hereby incorporated by reference.

I claim:

1. An image processing apparatus comprising:
   a block decompression unit to decompress, block by block, a compressed code having a plurality of blocks into which data of an image is divided, the compressed code being encoded block by block;
   a rendering control unit to cause one or more of the blocks corresponding to an area to be rendered of the image corresponding to a rendering region of a display unit to be extracted based on a signal indicating the rendering region of the display unit, and to cause a part of the compressed code corresponding to the extracted one or more of the blocks to be decompressed by the block decompression unit and rendered on the display unit before causing a remaining part of the compressed code to be compressed;
   a rendered image change instruction unit to give an instruction to change the area to be rendered of the image from a first area to a second area of the image;
   a changed image rendering unit to, when the instruction is given by the rendered image change instruction unit, decompress part of the compressed code that corresponds to one or more of the blocks of the data of the image that correspond to the second area of the image, and render the second area of the image in the rendering region of the display unit;
   a predicted block decompression unit to predict an area of the image to which the area to be rendered is changed from the first area based on the instruction given by the rendered image change instruction unit, and decompress, in advance, part of the compressed code that corresponds to a block of the data of the image that corresponds to the predicted area, wherein the changed image rendering unit renders the predicted area of the image in the rendering region when the block corresponding to the predicted area is identical to the block corresponding to the second area; and
   a rendering position change unit to change the area to be rendered, wherein the predicted block decompression unit predicts the area of the image to which the area to be rendered is changed from the first area based on a characteristic of the rendering position change unit when the rendered image change instruction unit is based on the rendering position change unit,
   wherein when the rendering position change unit performs pixel-by-pixel scrolling using a scroll bar, the predicted block decompression unit predicts that a block existing in a first direction from the first area is a next block to be rendered, the first direction being perpendicular to a second direction in which the scrolling has been performed to the first area.

2. The image processing apparatus as claimed in claim 1, wherein the block employed as a unit of dividing the image is a tile.

3. The image processing apparatus as claimed in claim 2, wherein the block employed as a unit of dividing the image is identical to a value defined by a profile.

4. The image processing apparatus as claimed in claim 1, wherein the block employed as a unit of dividing the image is a precinct.

5. The image processing apparatus as claimed in claim 4, wherein the block employed as a unit of dividing the image is identical to a value defined by a profile.

6. The image processing apparatus as claimed in claim 1, wherein the block employed as a unit of dividing the image is a code block.

7. The image processing apparatus as claimed in claim 6, wherein the block employed as a unit of dividing the image is identical to a value defined by a profile.

8. An image display apparatus, comprising:
   a display unit to display information;
   a receiver unit to receive via a network a compressed code formed of a plurality of blocks into which data of an image is divided, the compressed code being encoded block by block; and
   an image processing apparatus comprising:
   a block decompression unit to decompress, block by block, a compressed code having a plurality of blocks into which data of an image is divided, the compressed code being encoded block by block;
   a rendering control unit to cause one or more of the blocks corresponding to an area to be rendered of the image corresponding to a rendering region of the display unit to be extracted based on a signal indicating the rendering region of the display unit, and to cause a part of the compressed code corresponding to the extracted one or more of the blocks to be decompressed by the block decompression unit and rendered on the display unit before causing a remaining part of the compressed code to be compressed;
   a rendered image change instruction unit to give an instruction to change the area to be rendered of the image from a first area to a second area of the image;
   a changed image rendering unit to, when the instruction is given by the rendered image change instruction unit, decompress part of the compressed code that corresponds to one or more of the blocks of the data of the image that correspond to the second area of the image, and render the second area of the image in the rendering region of the display unit;
   a predicted block decompression unit to predict an area of the image to which the area to be rendered is changed from the first area based on the instruction given by the rendered image change instruction unit, and decompress, in advance, part of the compressed code that corresponds to a block of the data of the image that corresponds to the predicted area, wherein the changed image rendering unit renders the predicted area of the image in the rendering region when the block corresponding to the predicted area is identical to the block corresponding to the second area; and
   a rendering position change unit to change the area to be rendered, wherein the predicted block decompression unit predicts the area of the image to which the area to be rendered is changed from the first area based on a characteristic of the rendering position change unit when the rendered image change instruction unit is based on the rendering position change unit, wherein when the rendering position change unit performs pixel-by-pixel scrolling using a scroll bar, the predicted block decompression unit predicts that a block existing in a first direction from the first area is a next block to be rendered, the first direction being perpendicular to a second direction in which the scrolling has been performed to the first area.

9. An image display apparatus, comprising:

a display unit to display information;

an image compression unit to divide data for an image into a plurality of blocks and compresses and encodes each of the blocks into a compressed code; and an image processing apparatus comprising:

a block decompression unit to decompress, block by block, a compressed code having a plurality of blocks into which data of an image is divided, the compressed code being encoded block by block;

a rendering control unit to cause one or more of the blocks corresponding to an area to be rendered of the image corresponding to a rendering region of the display unit to be extracted based on a signal indicating the rendering region of the display unit, and to cause a part of the compressed code corresponding to the extracted one or more of the blocks to be decompressed by the block decompression unit and rendered on the display unit before causing a remaining part of the compressed code to be compressed;

a rendered image change instruction unit to give an instruction to change the area to be rendered of the image from a first area to a second area of the image;

a changed image rendering unit to, when the instruction is given by the rendered image change instruction unit, decompress part of the compressed code that corresponds to one or more of the blocks of the data of the image that correspond to the second area of the image, and render the second area of the image in the rendering region of the display unit, the image processing apparatus decompressing the compressed code generated by the image compression unit and causing the compressed code to be rendered on the display unit;

a predicted block decompression unit to predict an area of the image to which the area to be rendered is changed from the first area based on the instruction given by the rendered image change instruction unit, and decompress, in advance, part of the compressed code that corresponds to a block of the data of the image that corresponds to the predicted area, wherein the changed image rendering unit renders the predicted area of the image in the rendering region when the block corresponding to the predicted area is identical to the block corresponding to the second area; and a rendering position change unit to change the area to be rendered, wherein the predicted block decompression unit predicts the area of the image to which the area to be rendered is changed from the first area based on a characteristic of the rendering position change unit when the rendered image change instruction unit is based on the rendering position change unit, wherein when the rendering position change unit performs pixel-by-pixel scrolling using a scroll bar, the predicted block decompression unit predicts that a block existing in a first direction from the first area is a next block to be rendered, the first direction being perpendicular to a second direction in which the scrolling has been performed to the first area.

10. An image processing method comprising:

(a) decompressing, block by block, a compressed code having a plurality of blocks into which data of an image is divided, the compressed code being encoded block by block;

(b) causing one or more of the blocks corresponding to an area to be rendered of the image corresponding to a rendering region of a display unit to be extracted based on a signal indicating the rendering region of the display unit, and causing a part of the compressed code corresponding to the extracted one or more of the blocks to be decompressed and rendered on the display unit before causing a remaining part of the compressed code to be compressed;

(c) giving an instruction to change the area to be rendered of the image from a first area to a second area of the image;

(d) decompressing part of the compressed code corresponding to one or more of the blocks of the data of the image that corresponds to the second area of the image and rendering the second area of the image when the instruction is given by giving the instruction to change the area to be rendered;

(e) predicting an area of the image to which the area to be rendered is changed from the first area based on the instruction given by the rendered image change instruction unit, and decompressing, in advance, part of the compressed code that corresponds to a block of the data of the image that corresponds to the predicted area, wherein decompressing part of the compressed code renders the predicted area of the image in the rendering region when the block corresponding to the predicted area is identical to the block corresponding to the second area; and (f) changing the area to be rendered, wherein predicting the area of the image to which the area to be rendered is changed from the first area based on a characteristic of the change of the area to be rendered when the instruction is based on the change of the area to be rendered, wherein when performing pixel-by-pixel scrolling using a scroll bar includes predicting that a block existing in a first direction from the first area is a next block to be rendered, the first direction being perpendicular to a second direction in which the scrolling has been performed to the first area.

11. An article of manufacture having one or more computer-readable recording media storing a program which, when executed by a computer, causes the computer to execute an image processing method comprising:

(a) decompressing, block by block, a compressed code having a plurality of blocks into which data of an image is divided, the compressed code being encoded block by block;

(b) causing one or more of the blocks corresponding to an area to be rendered of the image corresponding to a rendering region of a display unit to be extracted based on a signal indicating the rendering region of the display unit, and causing a part of the compressed code corresponding to the extracted one or more of the blocks to be decompressed and rendered on the display unit before causing a remaining part of the compressed code to be compressed;

(c) giving an instruction to change the area to be rendered of the image from a first area to a second area of the image;

(d) decompressing part of the compressed code corresponding to one or more of the blocks of the data of the image that corresponds to the second area of the image and rendering the second area of the image when the instruction is given by giving the instruction to change the area to be rendered;

(e) predicting an area of the image to which the area to be rendered is changed from the first area based on the instruction given by the rendered image change instruction unit, and decompressing, in advance, part of the compressed code that corresponds to a block of the data of the image that corresponds to the predicted area, wherein decompressing part of the compressed code renders the predicted area of the image in the rendering region when the block corresponding to the predicted area is identical to the block corresponding to the second area; and (f) changing the area to be rendered, wherein predicting the area of the image to which the area to be rendered is changed from the first area based on a characteristic of the change of the area to be rendered when the instruction is based on the change of the area to be rendered, wherein when performing pixel-by-pixel scrolling using a scroll bar includes predicting that a block existing in a first direction from the first area is a next block to be rendered, the first direction being perpendicular to a second direction in which the scrolling has been performed to the first area.

12. An image display system including a server computer and a client computer connected to the server computer via a network comprising:

a block decompression unit to decompress, block by block, a compressed code having a plurality of blocks into which data of an image is divided, the compressed code being encoded block by block;

a rendering control unit to cause one or more of the blocks corresponding to an area to be rendered of the image corresponding to a rendering region of a display unit to be extracted based on a signal indicating the rendering region of the display unit, and to cause a part of the compressed code corresponding to the extracted one or more of the blocks to be decompressed by the block decompression unit and rendered on the display unit before causing a remaining part of the compressed code to be compressed;

a rendered image change instruction unit to give an instruction to change the area to be rendered of the image from a first area to a second area of the image;

a changed image rendering unit to, when the instruction is given by the rendered image change instruction unit, decompress part of the compressed code that corresponds to one or more of the blocks of the data of the image that correspond to the second area of the image, and render the second area of the image in the rendering region of the display unit;

a predicted block decompression unit to predict an area of the image to which the area to be rendered is changed from the first area based on the instruction given by the rendered image change instruction unit, and decompress, in advance, part of the compressed code that corresponds to a block of the data of the image that corresponds to the predicted area, wherein the changed image rendering unit renders the predicted area of the image in the rendering region when the block corresponding to the predicted area is identical to the block corresponding to the second area; and a rendering position change unit to change the area to be rendered, wherein the predicted block decompression unit predicts the area of the image to which the area to be rendered is changed from the first area based on a characteristic of the rendering position change unit when the rendered image change instruction unit is based on the rendering position change unit, wherein when the rendering position change unit performs pixel-by-pixel scrolling using a scroll bar, the predicted block decompression unit predicts that a block existing in a first direction from the first area is a next block to be rendered, the first direction being perpendicular to a second direction in which the scrolling has been performed to the first area.

* * * * *